(12) United States Patent
Fokker

(10) Patent No.: US 11,695,791 B2
(45) Date of Patent: Jul. 4, 2023

(54) SYSTEM FOR EXTRACTING, CLASSIFYING, AND ENRICHING CYBER CRIMINAL COMMUNICATION DATA

(71) Applicant: McAfee, LLC, San Jose, CA (US)

(72) Inventor: Johannes Everardus Fokker, Amsterdam (NL)

(73) Assignee: McAfee, LLC, San Jose, CA (US)

( * ) Notice: Subject to any disclaimer, the term of this patent is extended or adjusted under 35 U.S.C. 154(b) by 419 days.

(21) Appl. No.: 17/034,521

(22) Filed: Sep. 28, 2020

(65) Prior Publication Data

US 2022/0103575 A1 Mar. 31, 2022

(51) Int. Cl.
*G06F 16/2457* (2019.01)
*G06F 16/28* (2019.01)
*H04L 9/40* (2022.01)

(52) U.S. Cl.
CPC .... *H04L 63/1425* (2013.01); *G06F 16/24578* (2019.01); *G06F 16/285* (2019.01); *H04L 63/1416* (2013.01); *H04L 63/20* (2013.01)

(58) Field of Classification Search
CPC . H04L 63/1425; H04L 63/1416; H04L 63/20; G06F 16/285; G06F 16/24578
See application file for complete search history.

(56) References Cited

U.S. PATENT DOCUMENTS

| | | | |
|---|---|---|---|
| 7,930,256 B2 | 4/2011 | Gonsalves et al. | |
| 8,150,783 B2 | 4/2012 | Gonsalves et al. | |
| 8,285,619 B2 | 10/2012 | Herz et al. | |
| 8,949,164 B1 | 2/2015 | Mohler | |
| 9,602,530 B2 | 3/2017 | Ellis et al. | |
| 10,313,385 B2 | 6/2019 | Shakarian et al. | |
| 2014/0095425 A1 | 4/2014 | Sipple | |
| 2016/0110819 A1 | 4/2016 | Abramowitz | |
| 2017/0091617 A1 | 3/2017 | Baughman et al. | |
| 2018/0219903 A1* | 8/2018 | Segal | G06F 21/577 |
| 2019/0347327 A1 | 11/2019 | Patil et al. | |
| 2020/0134491 A1* | 4/2020 | Cruise | G06N 5/043 |
| 2020/0204574 A1* | 6/2020 | Christian | H04L 63/12 |

\* cited by examiner

*Primary Examiner* — Minh Chau Nguyen

(74) *Attorney, Agent, or Firm* — Patent Capital Group

(57) ABSTRACT

An apparatus, including systems and methods, for classifying, mapping, and predicting cybercriminal activity is disclosed herein. For example, in some embodiments, an apparatus is configured to: receive cybercriminal communication (CCC) data of postings from a source forum; identify, classify, and rank a threat topic for each posting; identify a first subset of postings that includes postings assigned the threat topic classification with the greatest threat topic rank; for each posting of the first subset of postings: identify and rank the threat actor; identify a second subset of postings that includes postings associated with the threat actor assigned the greatest threat actor rank; and send, to a cybersecurity data exchange module, the CCC data of the second subset of postings and associated enriched data including the source forum, the threat topic classifications, the threat actor, the threat actor rank, or the other threat actors that mentioned the threat actor.

20 Claims, 16 Drawing Sheets

ARTIFACTS

| SOURCE FORUM ARTIFACTS | THREAT TOPIC ARTIFACTS | THREAT ACTOR ARTIFACTS |
|---|---|---|
| • Source Forum ID<br>• Activity level of the source forum<br>• Official Forum Rank System | • Malware Name/Description<br>• Malware Hashes/Unique ID<br>• IP addresses/Partial IP addresses<br>• Target ID/Description<br>• URLs<br>• Credit Card data<br>• Credential data<br>• Social Security Numbers/Other Unique IDs<br>• CVE mentioning | • Moniker<br>• Email address/contact information<br>• Personal encryption key<br>• JabberID<br>• ICQ<br>• Telegram accounts<br>• Skype accounts<br>• Bitcoin/Altcoin addresses<br>• Contacts List<br>• Interests<br>• Timestamps of postings<br>• Message Body of postings<br>• Ranking on Source Forum<br>• Most Active Topic |

FIG. 4

THREAT TOPIC CLASSIFICATIONS

MALWARE

- Ransomware
- Banking Trojans
- Phishing Kits
- Information Stealers
- Exploit Kits
- Botnets
- RAT Tools
- PoS Tools
- Skimming Tools
- CVE-Exploit Sale
- Crypter Services
- Counter AV Services

ANONYMITY PROVIDERS

- VPN
- Socks

FINANCIAL LOGISTICS PROVIDERS

- Money Mule Services
- Bitcoin Mixing
- Reshipping

HACKING

- Corporate access for sale
- Websites for sale
- RDP systems for sale

BULLETPROOF HOSTING

- Bulletproof Service Providers

FRAUD

- Credit Cards
- Bank Accounts
- Customer Accounts

MODERATOR

- Disputes-Arguments
- Product Review

FIG. 5A

THREAT TOPIC CLASSIFICATIONS – KEYWORD LISTS

| RANSOMWARE | CVE-EXPLOIT SALE |
|---|---|
| • dharma<br>• offline<br>• cryptoclocker<br>• bugs fixed<br>• code rewritten<br>• reflective_dll<br>• powershell<br>• rigs<br>• bundles<br>• metasploit<br>• Windows<br>• C<br>• dependencies<br>• multithreaded encryption<br>• encrypt/encryption<br>• scan/scanning<br>• edit/edited/editing<br>• .exe<br>• .dll<br>• 86 kb/89 kb/10 mb<br>• AES/AES256 algorithm<br>• RSA algorithm/RSA 2048 algorithm<br>• PC<br>• memory/disks<br>• local drives/network drives<br>• hard drives/flash drives<br>• system files/files<br>• directory/resources/databases<br>• unique key/encrypted key<br>• unique user ID/create ID<br>• Locker<br>• program/program blocking<br>• function<br>• full/complete<br>• headers<br>• note<br>• stream<br>• HDD | • LPE<br>• exploit<br>• CVE<br>• CVE-2019-1069<br>• local privilege escalation<br>• system level<br>• Windows 10<br>• Server 2016/2019<br>• versions 1903<br>• vulnerability<br>• target/targeted<br>• login/password<br>• current account<br>• account<br>• user rights<br>• UAC<br>• bypassed<br>• POC<br>• network<br>• operation<br>• modules<br>• debugged<br>• tested<br>• conditions<br>• KTS 2019<br>• Avast IS 2019<br>• ESET File Security 7.1.12006<br>• USD BTC Guarantee<br>• contacts<br>• communication |

FIG. 5B

S [Affiliate] Crypto Locker (Ransomware)
Posted by: Scoorge , September 30, 2019 in [Virology] - malware, exploits, bundles, AZ, crypts

Scoorge
byte

S

Seller
~ 0
11 posts
Registration
07.10.2019
(ID. 96 197)
Virology / malware
activities Posted: September 30, 2019 (changed)

Good time.

I propose to join our crypto-locker affiliate program.
Since 2016, we have been working in this direction, tested dozens of different offers, did not find the optimal solution from the finished ones, created our product, successfully tested within the team and are ready *to accept 10 new partners* .

Description:
Crypto-locker is an invisible program in a static assembly written in C ++.
The program is native and does not require additional libraries for its work.

- At startup, the Locker checks that no other instances of the program have been launched.
- Then, it bypasses the UAC, and in case of failure will ask the user until he clicks the yes button.
- Then it is added to autoload. Being at startup at the specified interval, checks that the Locker is running. If the Locker is not running, it will start it (protection against closing).
- Before starting work, the Locker will stop and delete the specified services.
- Then complete the indicated processes. (lists of services and processes recommended for stopping and closing are in the standard settings, but you can always add your own)
- Next, it will empty the recycle bin, delete backup copies and system restore points.
- Getting started, the Locker will endlessly "hang" in memory and work, constantly scanning disks (hard drives, flash drives, network drives, etc.), as well as scanning the network to detect shared resources.
- Before starting the actual scan and encryption, the Locker will generate a unique key for encrypting files with the AES256 algorithm, encrypt this key with the RSA2048 algorithm and create an ID for the PC from the encrypted key.
- For each disk or shared resource found, it is allocated downstream to encrypt files.
- If any file is blocked by an open program, Locker *will find and close the program blocking the file* .and then try to re-encrypt the file.
Surely, you are familiar with a situation when a file cannot be edited, because it is open in another program, so this function will close this program and process the file.
- The locker supports file encryption rules: Full (encrypts the entire file), Headers + 10 mb (partially encrypts the file), Exceptions (does not encrypt the file). The speed of work strongly depends on the selected rules, by default only databases are completely encrypted, the rest is based on the headers, excluding system files and .exe (you can specify your settings).
- In each directory where the files were encrypted, Locker leaves a note containing a unique user ID.
- The locker constantly "hangs" in memory and continues to scan for new disks or files. When connecting new HDD / flash drives, the locker immediately begins to work them out in a separate stream.

Hurry up to take a place, the first contact in the PM.
The message must indicate the source, GEO and the number of downloads, work experience.

FIG. 6A

[RANSOMWARE PARTNER] Crypto Locker
Posted by: keystorm, October 28, 2019 in [Virology] - malware, exploits, bundles, AZ, crypts ketstorm
byte

Paid registration
⭐
17 posts
Registration
03.09.2019
(ID: 95 460)
Virology /
malware activities Posted: October 28, 2019 (changed)

Dear Sir or Madam, Good day. I want to introduce to you the development of a new offline cryptoclocker based on dharma, the name of this cryptoclocker has not been invented at the moment, the cryptoclocker itself is currently no different from dharma, it even surpasses it: bugs fixed, code rewritten, added support for reflective_dll. A little background: in general, all this was started only because of reflective_dll and the software was not supposed to see the light and was developed only for private access, because for some reason all the cryptoclocker developers when they were asked to make very important support for reflective_dll, or refused to either didn't see the point in this, or asked for cosmic amounts for revision, although in fact with a ready outcome on hand, this whole remaking procedure takes 1-2 hours with tests and there's nothing difficult about that. But the profit from reflective_dll is already at the level - it supports powershell scripts, which, by the way, have been tested and work stably with the DLL. Using rigs, bundles, metasploit, and more. Just one refinement makes it universal. Now let's move on to the main thing:

RANSOMWARE
the product is implemented in C;
it has no third-party dependencies;
supports all Windows lines;
multithreaded encryption, encrypts local drives;
weight of the original .exe file 86 kb, .dll 89 kb;
AES + RSA encryption algorithm is used;

Software is fully tested and operational. At the moment, there is an emphasis in LPE, a personal powershell reflective_dll generator with a bias on FUD, as well as the addition of exp MS17-010 from worawit. Naturally, the original was rewritten and finalized, there will be attempts to "break through" in several different ways and with different logins, at the moment it is already completely in C. The issue of implementation and the attempt to remain completely offline with a cryptoclocker is solved, if it does not succeed, then on broken machines just powershell reflective_dll will be launched which loads the DLL itself from the outside. Such a method will produce an almost complete FUD. An attempt to break through the local network, of course, will be after the software finishes working on the target machine. No matter who says MS17-010, but we know from personal experience that at least 50% of the corporate network of 100 machines are vulnerable. So why not add a little more $ than expected? We will redo the notes and the locker window for large partners for your Nox or any other communication methods, since with a large flow, unfortunately, whatever mail you use, it will sooner or later be blocked. Mail is used only for point strikes and is not designed for large volumes.
For all questions of interest, please contact:
keystorm@shangryla.net
keystorm@xmpp.jp nextbuxs
мегабайт

Пользователь
0
80 публикаций Регистрация
18.04.2018 (ID: 86 953)
Деятельность
другое

Sent request to u.....i am interested in it.    reply me on jabber

Did you see the post by Scoorge last month?

craigallen06
байт

Платная регистрация
6
7 публикаций Регистрация
07.01.2020 (ID: 98 906)
Деятельность seo hello i am interested in your exploit and i messaged you on Jabber with dimtrik28@xabber.org. Kindly reply @nextbuxs - I saw post by Scoorge message me on Jabber

FIG. 6B

| OFR | Value |
|---|---|
| Owner | 13 |
| Admin | 12 |
| S-Moderator | 11 |
| Moderator | 10 |
| Seller | 9 |
| Developer | 8 |
| ViP | 7 |
| Legend | 6 |
| Elite Member | 5 |
| Elite | 4 |
| S-Member | 3 |
| Member | 2 |
| Paid Member | 1 |

FIG. 8A

| PA Years | PA Weight | TA1 | TA2 |
|---|---|---|---|
| 1/2010-12/2012 | 1 | 6 | 0 |
| 1/2013-12/2014 | 2 | 0 | 0 |
| 1/2015-12/2016 | 3 | 1 | 0 |
| 1/2017-12/2018 | 4 | 0 | 2 |
| 1/2019-12/2020 | 5 | 0 | 3 |
| PA Score | | 9 | 23 |
| Threshold Value = 14 | | Low | High |

FIG. 8B

| | OFR | PA Score | 3rd-mentions | TA Rank = OFR x PA Score + 3rd-mentions |
|---|---|---|---|---|
| TA1 | 11 | 9 | 0 | 99 |
| TA2 | 8 | 23 | 2 | 186 |

FIG. 8C

SYSTEM FOR EXTRACTING, CLASSIFYING, AND ENRICHING CYBER CRIMINAL COMMUNICATION DATA

TECHNICAL FIELD

This disclosure relates in general to computer security and, more particularly though not exclusively, to systems and methods to enhance cybersecurity intelligence by extracting, classifying, and enriching cybercriminal communication data from the dark web to identify cyber threats and their sources.

BACKGROUND

The field of computer security has become increasingly important in today's society. While the use of computer networks has transformed business and personal communications, it has also been used as a vehicle for malicious operators to gain unauthorized access to computers. The number of cyber attacks that target networked user devices as well as networked computers in corporate organizations continue to increase year after year. Cyber criminals use underground communication channels to exchange malicious techniques, sell malware, identify targets, exploit computer system vulnerabilities, and offer malware services to carry out cyber attacks.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

FIG. 4 is a table illustrating exemplary artifacts extracted from cybercriminal communication data, in accordance with various embodiments of the present disclosure.

FIG. 5A is a table illustrating exemplary threat topic classifications, in accordance with various embodiments of the present disclosure.

FIG. 5B is a table illustrating exemplary keyword lists for two threat topic classifications of FIG. 5A, in accordance with various embodiments of the present disclosure.

FIGS. 6A-6C are exemplary threat topic classifications of CCC postings using a keyword list, in accordance with various embodiments of the present disclosure.

FIG. 8A is a table illustrating exemplary official forum rankings, in accordance with various embodiments of the present disclosure.

FIG. 8B is a table illustrating exemplary posting activity scores for a threat actor, in accordance with various embodiments of the present disclosure.

FIG. 8C is a table illustrating exemplary threat actor ranks, in accordance with various embodiments of the present disclosure.

DETAILED DESCRIPTION

Figure 1:
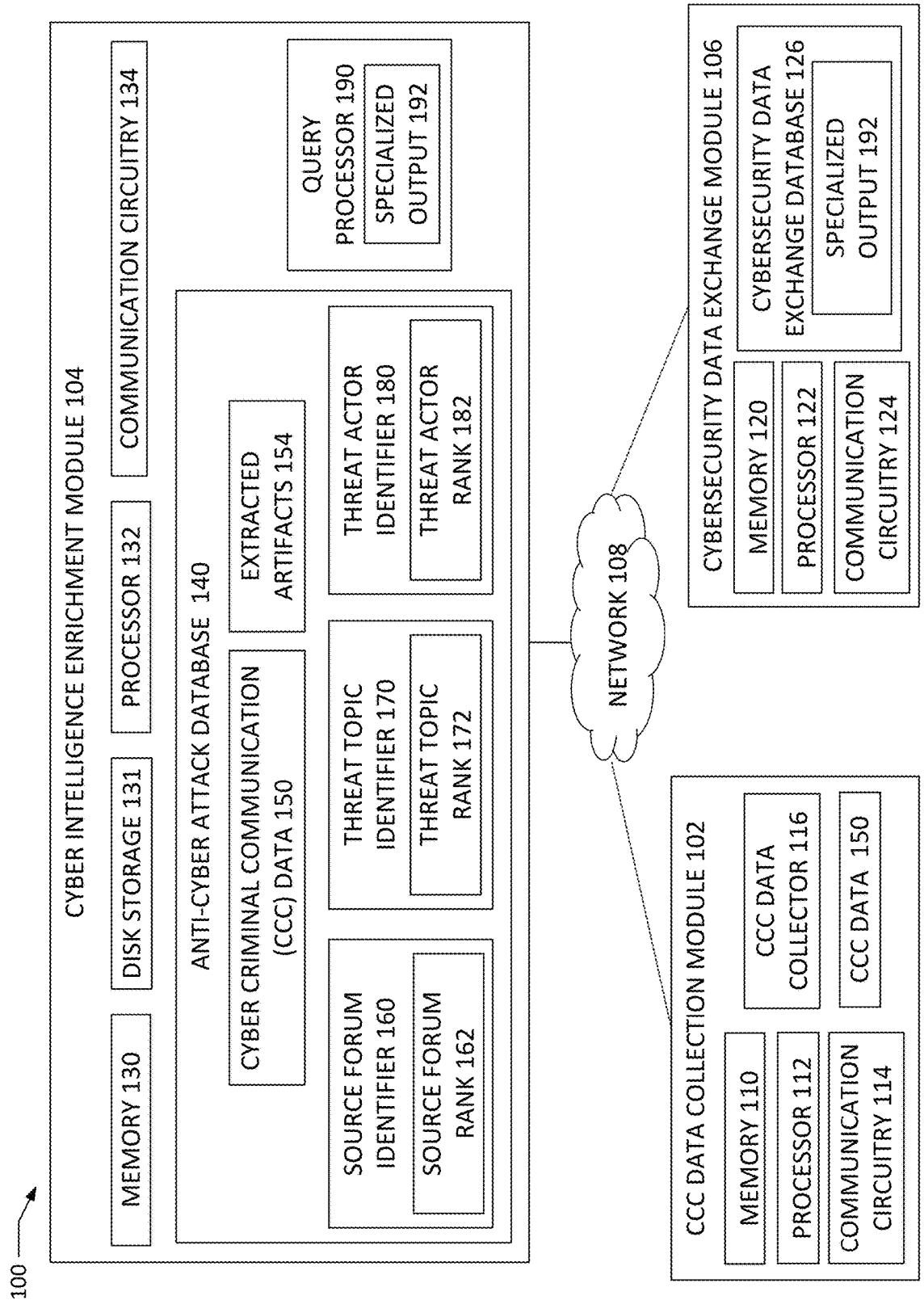
FIG. 1 is a simplified block diagram of an example cybersecurity intelligence system for enriching cybercriminal communication data, in accordance with various embodiments of the present disclosure.

An apparatus, including systems and methods, for extracting, classifying, mapping, and enriching cybercriminal communication data to identify a cyber attack and its sources is disclosed herein. For example, in some embodiments, an apparatus is configured to: receive and store cybercriminal communication (CCC) data of postings from a source forum; extract artifacts from the CCC data, wherein the extracted artifacts indicate the source forum, a threat topic, or a threat actor of a posting; identify, classify, and rank a threat topic for each posting; identify a first subset of postings that includes postings assigned the threat topic classification with the greatest threat topic rank; for each posting of the first subset of postings: identify and rank the threat actor; identify a second subset of postings that includes postings associated with the threat actor assigned the greatest threat actor rank; and send, to a cybersecurity information exchange module, the CCC data of the second subset of postings and associated enriched data including the source forum, the threat topic classifications, the threat actor, the threat actor rank, or the other threat actors that mentioned the threat actor.

Cybercriminal underground communication channels, generally referred to as the dark web, are places for cybercriminals to exchange malicious techniques and to sell malicious software, tools, and services. For example, cybercriminals may develop malware, post the malware for sale on dark web forums, communicate via dark web messaging programs, and conduct business transactions via dark web marketplaces using bitcoin or other crypto-currencies. Collecting CCC data of these exchanges describing breaches, exposed credentials, exploits, new malware, and other malicious services may provide key information to assist in tracking and anticipating cybercriminal activity. A cybercriminal may exhibit particular patterns, methodologies, behaviors, and malware programming techniques, commonly referred to as Indicators of Compromise (IoC) and Tactics, Techniques and Procedures (TTPs), when instigating a cyber attack, which may be useful to associate a cybercriminal with a cybercrime. Gathering, analyzing, categorizing, and enriching the vast amounts of CCC data (e.g., with IoCs and TTPs) is extremely time consuming and labor-intensive. Current solutions offer a platform or portal for analysts to manually search, analyze, and interpret the CCC data. These conventional techniques, which rely heavily on the qualitative skills of the analyst, often produce incomplete and variable results, and fail to provide a way of importing the interpreted data into a third-party system, such as a cybersecurity intelligence exchange database. Further, identifying a high-risk threat by a high-risk actor, which is more likely to result in successful a cyber attack, requires efficient and precise mining of enormous amounts of CCC data. Current solutions fail to provide a complete cyber attack overview, including preattack intelligence indicating a potential attack, peri-attack intelligence matching IoCs and TTPs with an ongoing attack, and post-attack intelligence linking pre-attack and peri-attack intelligence with post-attack forensic evidence. A comprehensive system that extracts, classifies, and ranks large quantities of CCC data according to a predefined taxonomy of artifacts to identify pre-, peri-, and post-attack cybercriminal activity and providing a customizable output for intelligence sharing may be desired.

As used herein, the term "source forum" refers to the online website where cybercriminals can communicate in the form of posted messages, and where the posted messages may be temporarily stored or archived. The terms "source forum," "forum," "source," "host," "host site," and "hosting provider" may be used interchangeably herein. As used herein, the term "threat actor" refers to an individual, a group, or an organization that posts a message on a source forum. The terms "threat actor," "poster," "actor," and "originator" may be used interchangeably herein. As used herein, the term "threat topic" refers to malicious software (i.e., malware) and other hacking software designed to infect and/or gain unauthorized access to computer systems, and includes, for example, viruses, worms, ransomware, Trojan horses, and spyware. The terms "threat topic," "threat," "cybercrime," and "posting thread subject" may be used interchangeably herein.

As used herein, the term "module" may refer to hardware, firmware and/or circuitry configured to perform any of the aforementioned operations. A module may further include software. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. As used herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms a part of one or more devices, as defined previously. The terms "module," "engine," and "administrator" may be used interchangeably herein.

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The drawings are not necessarily to scale.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The meaning of "a," "an," and "the" include plural references. The meaning of "in" includes "in" and "on." When used to describe a range of dimensions, the phrase "between X and Y" represents a range that includes X and Y. For convenience, the phrase "FIG. 3" may be used to refer to the collection of drawings of FIGS. 3A-3C, etc. Although certain elements may be referred to in the singular herein, such elements may include multiple sub-elements.

FIG. 1 is a simplified block diagram of a cybersecurity intelligence system 100 for enriching cybercriminal communication data, in accordance with an embodiment of the present disclosure. The cybersecurity intelligence system 100 disclosed herein may be configured to identify a credible cyber threat by a credible actor by analyzing, classifying, and enriching CCC data and related artifacts. The cybersecurity intelligence system 100 may be further configured to process queries and provide customized output that may be integrated into existing cybersecurity data exchange platforms and other frameworks for enhanced tracking and identifying cyber criminals and cyber attacks. The cybersecurity intelligence system 100 enables large amounts of CCC data to be gathered, analyzed, enriched, and shared with other cyber threat intelligence resources, and all at an early stage of a cyber crime (e.g., usually prior to a cyber attack). CCC data may be received from underground communication channels, such as the dark web, and stored in a database with extracted artifacts. The extracted artifacts may be used to identify and categorize cybercriminal activity related to a source forum, a threat actor, and/or a threat topic. By categorizing the CCC data, a more accurate and complete picture may be provided so that a source forum, a threat actor, and a threat topic may be identified to prevent, or, if in progress or completed, to mitigate a cyber attack. The CCC data may be retrieved or scraped from the dark web and may include a plurality of postings on one or more source forums. For example, the CCC data may include a posting by a first threat actor may offer to sell ransomware on a first source forum and another posting by a second threat actor may provide details on how to code malware for a particular target on a second source forum. The received CCC data may be stored in a database. Artifacts may be extracted from the CCC data. The extracted artifacts may be related to one or more of a source forum, a threat actor, and a threat topic. The extracted artifacts may be used to identify the threat topics on each source forum and assign a risk score to the threat topics such that the source forum having threat topics with greater risk scores may be prioritized to identify the threat actors and assign a threat actor rank. The threat actor rank may be assigned based on the official source forum rank (OFR), the threat actor's posting activity, and/or the threat actor's relationships with other threat actors. The extracted artifacts, the identified source forums and associated source forum rankings, the identified threat topics and associated threat topic rankings, and the identified threat actors, their relationships, and associated threat actor rankings may be stored in the database with the CCC data. The database may be queried to provide specialized output that includes the CCC data and the associated enriched data that may be exported to other cybersecurity data exchange platforms.

As illustrated in FIG. 1, an embodiment of cybersecurity intelligence system 100 may include a CCC data collection module 102, a cyber intelligence enrichment module 104, a cybersecurity data exchange module 106, and network 108. The CCC data collection module 102 may include memory 110, a processor 112, communication circuitry 114, and a CCC data collector 116. The CCC data collection module 102 may be configured to collect CCC data 150 by, for example, scraping websites on the dark web, receiving CCC data 150 from a third-party feed, or receiving CCC data via intelligence sharing between Private-Public sector partnerships. The CCC data collection module 102 may temporarily store the CCC data 150 on disk storage (not shown). In some embodiments, the CCC data 150 may include a plurality of postings made on a single source forum. In some embodiments, the CCC data 150 may include a plurality of postings made on a plurality of source forums. The CCC data collection module 102 may be a network element and include, for example, servers, desktop computers, laptop computers, mobile devices, personal digital assistants, smartphones, tablets, or other similar devices. The CCC data collection module 102 may include one or more processors 112 for executing any type of instructions associated with achieving the operations detailed herein. The processor 112 is connected to memory 110 and communication circuitry 114. The processor 112 may be based on one or more processors, microcontrollers, microprocessors, and programmable logic devices, among others. The memory 110 may include one or more memory elements. The memory 110 may store computer executable instructions or computer executable components as well as other data, such as the CCC data 150. The processor 112 executes computer executable instructions stored in memory 110. The communication circuitry 114 may be used to send and receive commands, requests, and other data to and from the CCC data collection module 102. The CCC data collector 116 may be connected to the processor 112, the memory 110, and the communication circuitry 114 to perform the operations described herein.

The cyber intelligence enrichment module 104 may include memory 130, disk storage 131, a processor 132, communication circuitry 134, an anti-cyber attack database 140, and a query processor 190. The anti-cyber attack database 140 may include CCC data 150 received from the CCC data collection module 102, extracted artifacts 154, a source forum identifier 160, a source forum rank 162, a threat topic identifier 170, a threat topic rank 172, a threat actor identifier 180, and a threat actor rank 182. The anti-cyber attack database 140 may be stored on disk storage 131. In some embodiments, the anti-cyber attack database 140 may be stored on a single disk storage 131 such that the data is centrally located. The cyber intelligence enrichment module 104 may be configured to receive the CCC data 150 and store the CCC data 150 on disk storage 131. The CCC data 150 may be stored in any suitable format, such as unstructured text, raw text, images, and/or data encoded in text format (e.g., in machine readable format). The cyber intelligence enrichment module 104 may be further configured to extract and store artifacts 154 from the CCC data 150. The extracted artifacts 154 may be stored on the disk storage 131 according to a defined taxonomy, such that the extracted artifacts 154 are stored in a structured format. For example, the extracted artifacts may be stored by author, by title, by content, by replies, or by date, among others. The extracted artifacts 154 may include data from a posting of the CCC data 150 to identify the source forum, the threat topic, and the threat actor associated with the posting. The extracted artifacts 154 may be used to determine a source forum rank 162, a threat topic rank 172, and a threat actor rank 182 associated with a particular posting of the CCC data 150. The query processor 190 may perform searches in the anti-cyber attack database 140 and may provide specialized output 192. The specialized output 192 may include the CCC data 150 and associated enriched data for the CCC data 150, including, for example, one or more of the source forum identifier 160, the source forum rank 162, the threat topic identifier 170, the threat topic rank 172, the threat actor identifier 180, and the threat actor rank 182. The specialized output 192 may be formatted for a particular cybersecurity data exchange module 106 for integration with other cybersecurity intelligence data, such as McAfee MVISION Insights, MISP Threat Sharing, MITRE ATT&CK® or STIX/TAXII/CybOX, and may allow for multiple use cases including enterprise products, consumer protection products, and intelligence-as-a-service feed. The processor 132 is connected to memory 130 and communication circuitry 134. The processor 132 may be based on one or more processors, microcontrollers, microprocessors, and programmable logic devices, among others. Memory 130 may include one or more memory elements. Memory 130 may store computer executable instructions or computer executable components as well as other data, such as the specialized output 192. The processor 132 executes computer executable instructions stored in memory 130. The communication circuitry 134 may be used to send and receive commands, requests, and other data to and from the cyber intelligence enrichment module 104. The anti-cyber attack database 140 and the query processor 190 may be connected to the processor 132, the memory 130, and the communication circuitry 134 to perform the operations described herein.

The cybersecurity data exchange module 106 may include memory 120, a processor 122, communication circuitry 124, and a cybersecurity data exchange database 126. The cybersecurity data exchange database 126 may include other cyber security data as well as the specialized output 192 received from the cyber intelligence enrichment module 104. For example, cybersecurity data exchange module 106 may be a collective knowledge base of cyber attack tactics and techniques to aid in the development of threat models, methodologies, and more effective countermeasures to enhance cybersecurity. The cybersecurity data exchange module 106 may be configured to request that the query processor 190 of the cyber intelligence enrichment module 104 perform a query on the anti-cyber attack database 140 and may receive the specialized output 192 in response to the request. The specialized output 192 may include a portion of the CCC data and associated enriched data, including one or more of the source forum, the threat topic classification, the threat topic rank, the threat actor, the threat actor rank, and the other threat actors that mentioned the threat actor. In some embodiments, the cybersecurity data exchange module 106 may request that the specialized output 192 be provided in a particular format or framework for importing into the cybersecurity data exchange database 126.

The processor 122 may be based on one or more processors, microcontrollers, microprocessors, and programmable logic devices, among others. Memory 120 may include one or more memory elements. Memory 120 may store computer executable instructions or computer executable components as well as other data, such as the specialized output 192. The processor 122 executes computer executable instructions stored in memory 120. The communication circuitry 124 may be used to send and receive commands, requests, and other data to and from the cybersecurity data exchange module 106. The cybersecurity data exchange database 126 may be connected to the processor 122, the memory 120, and the communication circuitry 124 to perform the operations described herein. The CCC data collection module 102, the cyber intelligence enrichment module 104, and the cybersecurity data exchange module 106 may be in communication using network 108.

The one or more processors 112, 122, 132 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The processors may be implemented in hardware, or combinations of hardware, and software and/or firmware, as appropriate. Software or firmware implementations of the processors may include computer-executable or machine-executable instructions written in any suitable programming language to perform the various functions described. Hardware implementations of the processors may be configured to execute computer-executable or machine-executable instructions to perform the various functions described. The modules 102, 104, 106 may further include a chipset (not shown) for controlling communications between one or more processors and one or more of the other components of the device. The processors 112, 122, 132 may also include one or more application specific integrated circuits (ASICs) or application specific standard products (ASSPs) for handling specific data processing functions or tasks.

The one or more memory elements 110, 120, 130 may include one or more volatile and/or non-volatile memory devices such as, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof. The memory 110, 120, 130 may store program instructions that are loadable and executable on the processor(s) as well as data generated or received during the execution of these programs. The memory 110, 120, 130 may have stored thereon software modules and/or instructions associated with other components of the device.

The modules 102, 104, 106 may include communication circuitry 114, 124, 134, respectively. The communication circuitry 114, 124, 134 may be embodied as any communication circuitry, device, or collection thereof, capable of enabling communications between the modules 102, 104, 106 and other devices (not shown). The terms "communication circuitry" and "input/output (I/O) circuitry" may be used interchangeably herein. The communication circuitry 114, 124, 134 may be configured to use any one or more communication technology (e.g., wireless or wired communications) and associated protocols (e.g., Ethernet, Bluetooth®, Wi-Fi®, WiMAX, etc.) to effect such communication. The modules 102, 104, 106 may further include peripheral devices (not shown), which may include any number of additional peripheral or interface devices and associated I/O circuitry, such as speakers, microphones, additional storage devices, among others.

Network 108 represents interconnected communication paths for receiving and transmitting packets of information that propagate through the cybersecurity intelligence system 100. Network 108 may provide a communicative interface between modules 102, 104, 106 and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. Network 108 may include a network controller.

In cybersecurity intelligence system 100, network traffic, which is inclusive of packets, frames, signals, and data, among others, may be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may be provided. Suitable interfaces and infrastructure may be provided to enable communication with the cellular network.

The term "packet" as used herein, refers to a unit of data that may be routed between networked modules 102, 104, 106. A packet may include a source network address and a destination network address. These network addresses may be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, and/or data.

Figure 2:
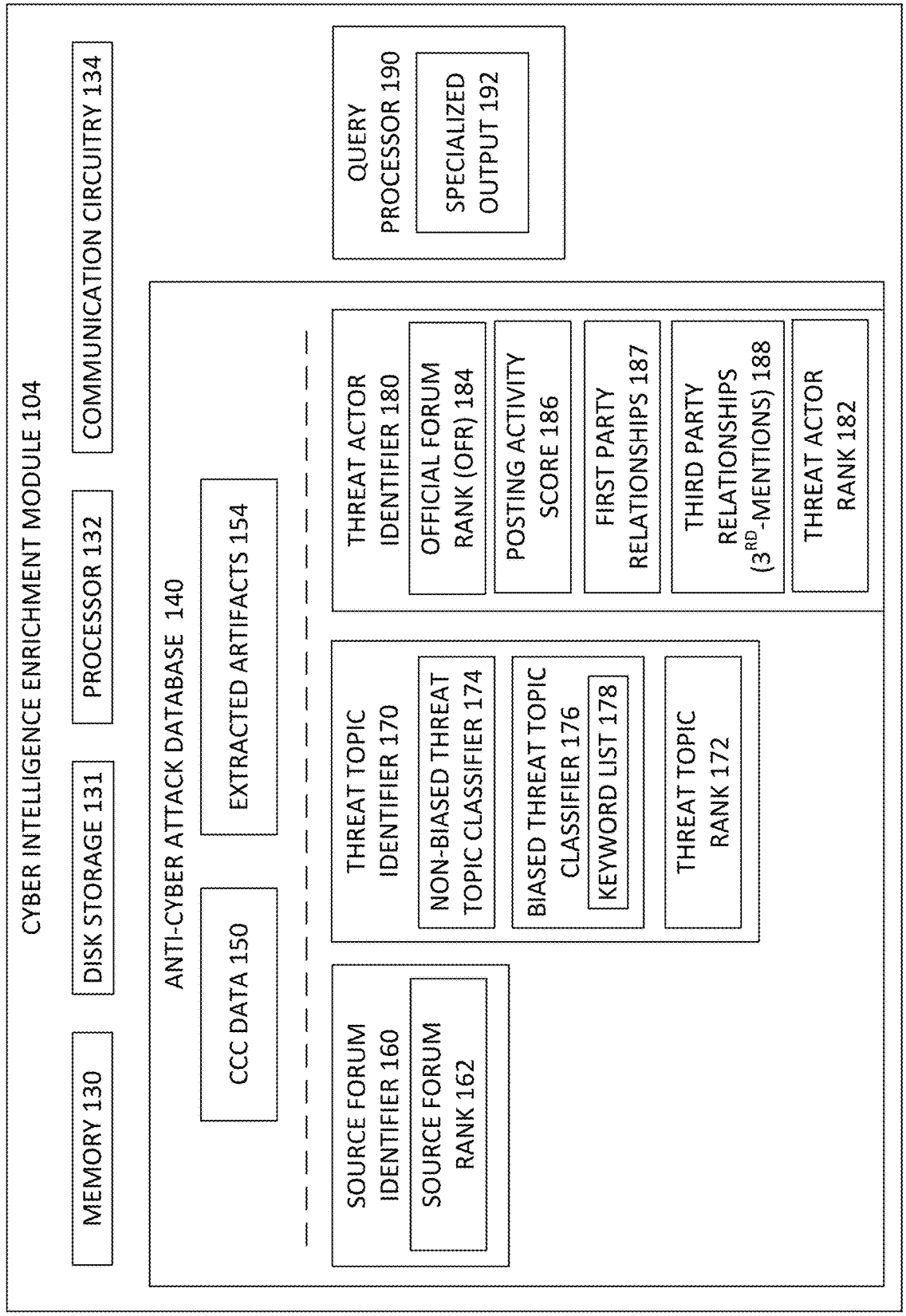
FIG. 2 is a simplified block diagram of an example cyber intelligence enrichment module of FIG. 1, in accordance with various embodiments of the present disclosure.

FIG. 2 is a simplified block diagram of an example cyber intelligence enrichment module, in accordance with an embodiment of the present disclosure. The cyber intelligence enrichment module 104 may be further configured to classify a threat topic using a non-biased threat topic classifier 174 and/or using a biased threat topic classifier 176. The non-biased threat topic classifier 174 analyzes threat topic-related extracted artifacts and the CCC data 150 using a Natural Language Processing (NLP) algorithm to identify and classify the non-biased threat topics for each posting from an identified source forum. The non-biased threat topic classifier 174 automates the threat topic classification process and allows for classifying large amounts of CCC data more consistently and more quickly. For example, the source forum may assign a title or a subject to a posting that is inconsistent with the actual content of the posting, whereas the non-biased threat topic classifier 174 identifies and classifies the threat topic based on the actual content of the posting.

The biased threat topic classifier 176 analyzes threat topic-related extracted artifacts and the CCC data 150 using a keyword list 178 to identify and classify the biased threat topics for each posting from an identified source forum. The biased threat topic classifier 176 compares the actual content of the posting against a qualitative keyword list specific to a threat topic classification and scores the matching terms in the posting. The comparison and scoring are performed for one or more biased threat topic classifications 176. The posting is assigned the biased threat topic classification 176 having the highest score or the most keyword list 178 matches. For example, the scoring may be determined by adding the number of keyword list 178 matches or by using a weighted average where a first term is scored higher than a second term. The keyword list 178 is developed using common terms associated with the specific threat topic. For example, as described below with reference to FIGS. 5B, 6A and 6B, the ransomware keyword list may include the terms crypto, powershell, scanning, encryption, and metasploit, and a posting having a higher scoring on the ransomware-related keyword list is assigned ransomware as the threat topic classification 176. As used herein, the terms "keyword list" and "keyword topic list" may be used interchangeably.

The threat topics classified using the non-biased threat topic classifier 174 or the biased threat topic classifier 176 may be assigned a threat topic rank 172 based on the threat topic classification. The assigned threat topic rank 172 may identify the threat topic with the greatest significance or risk. For example, the threat topic rank 172 may indicate that the threat topic has the greatest risk of damage, has the greatest likelihood of success, is the most popular threat topic in a recent period of time, or is the most difficult to detect. The threat topic rank 172 may be any numerical value, or relative term, such as high/medium/low, that enables the ranking of a plurality of threat topics to indicate a threat topic having a higher priority, a higher significance, or a greater threat risk as compared to another threat topic having a lower significance, a lower priority, or a lesser threat risk. A source forum rank 162 may be assigned based on the threat topic rankings 172 of the source forum. The assigned source forum rank 162 may identify the source forum to prioritize and perform additional analysis or may indicate the source forum with the greatest risk. The source forum rank 162 may be any numerical value, or relative term, such as high/medium/low, that enables the ranking of a plurality of source forums to indicate a source forum having a higher priority, a higher significance, or a greater threat risk as compared to another source forum having a lower significance, a lower priority or a lesser threat risk.

The cyber intelligence enrichment module 104 may be further configured to determine a threat actor's official forum rank (OFR) 184 on a source forum, a threat actor's posting activity score 186, the threat actor's first party relationships 187 (i.e., the threat actor's direct connections with other threat actors who post a response to the threat actor's posting), the threat actor's third party relationships 188 (i.e., the threat actor's indirect connections with other threat actors on the source forum who mention or refer to the threat actor in a post that is not in response to the threat actor's posting (also referred to as "third-mentions")), and a threat actor rank 182. The threat actor's OFR 184 is an internal ranking system of a source forum and is assigned by the source forum. Each source forum may have a different ranking system for assigning the OFR 184. In some embodiments, the OFR 184 is a numerical value. In some embodiments, the OFR 184 is a described rank, such as member or VIP, and a numerical value may be assigned to the described rank. For example, as described below with referenced to FIG. 8A, based on the source forum's internal ranking system, the lowest rank may be assigned an OFR value of 1 and each incremental rank may be assigned an OFR value that is increased by 1 for each rank increase. The threat actor's OFR 184 may be determined based on the extracted artifacts 154 or may be retrieved from the identified source forum. The threat actor's posting activity (PA) score 186 indicates the threat actor's posting presence on the identified source forum. The threat actor's posting activity (PA) score 186 may be determined based on how often the threat actor has posted on the source forum, how recently the threat actor has posted on the source forum, or how often and how recently the threat actor has posted on the source forum. For example, as described below with reference to FIG. 8B, the threat actor's PA score 186 may be determined using a weighted average of a number of times the threat actor posted and a date or an age of the threat actor's postings, where more recent postings are given a higher score and less recent postings are given a lower score. The third-mentions 188 may be determined based on identifying a number of times the threat actor is mentioned in posts by other threat actors on the source forum. The third-mentions 188 may be identified by searching the CCC data 150 from the source forum for the threat actor identifier 180 (e.g., moniker or username) and counting the number of posts by other threat actors that mention the threat actor. The threat actor may be assigned a threat actor rank 182 based on one or more of the OFR 184, the PA score 186, and the third-mentions 188. The threat actor rank 182 may be any numerical value, or relative term, such as high/medium/low, that enables the ranking of a plurality of threat actors to indicate a threat actor having a higher priority, a higher significance, or a greater threat risk as compared to another threat actor having a lower priority, a lower significance, or a lesser threat risk. In some embodiments, the threat actor rank 182 is equal to the OFR 184 multiplied by the PA score 186 plus the third-mentions 188.

Figure 3A:
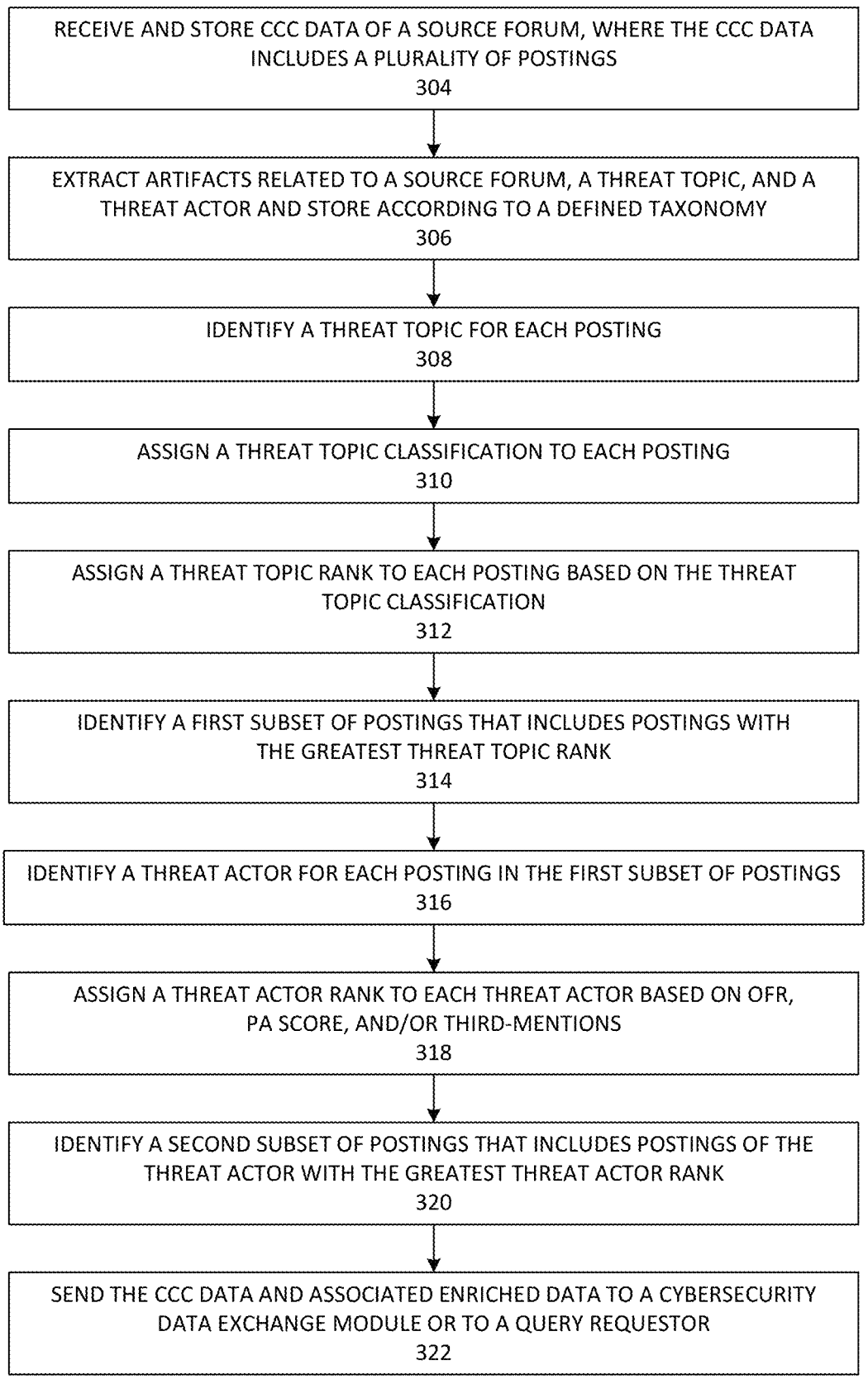
FIGS. 3A-3C are exemplary flow diagrams illustrating potential operations that may be associated with enriching cybercriminal communication data, in accordance with various embodiments of the present disclosure.
Figure 3B:
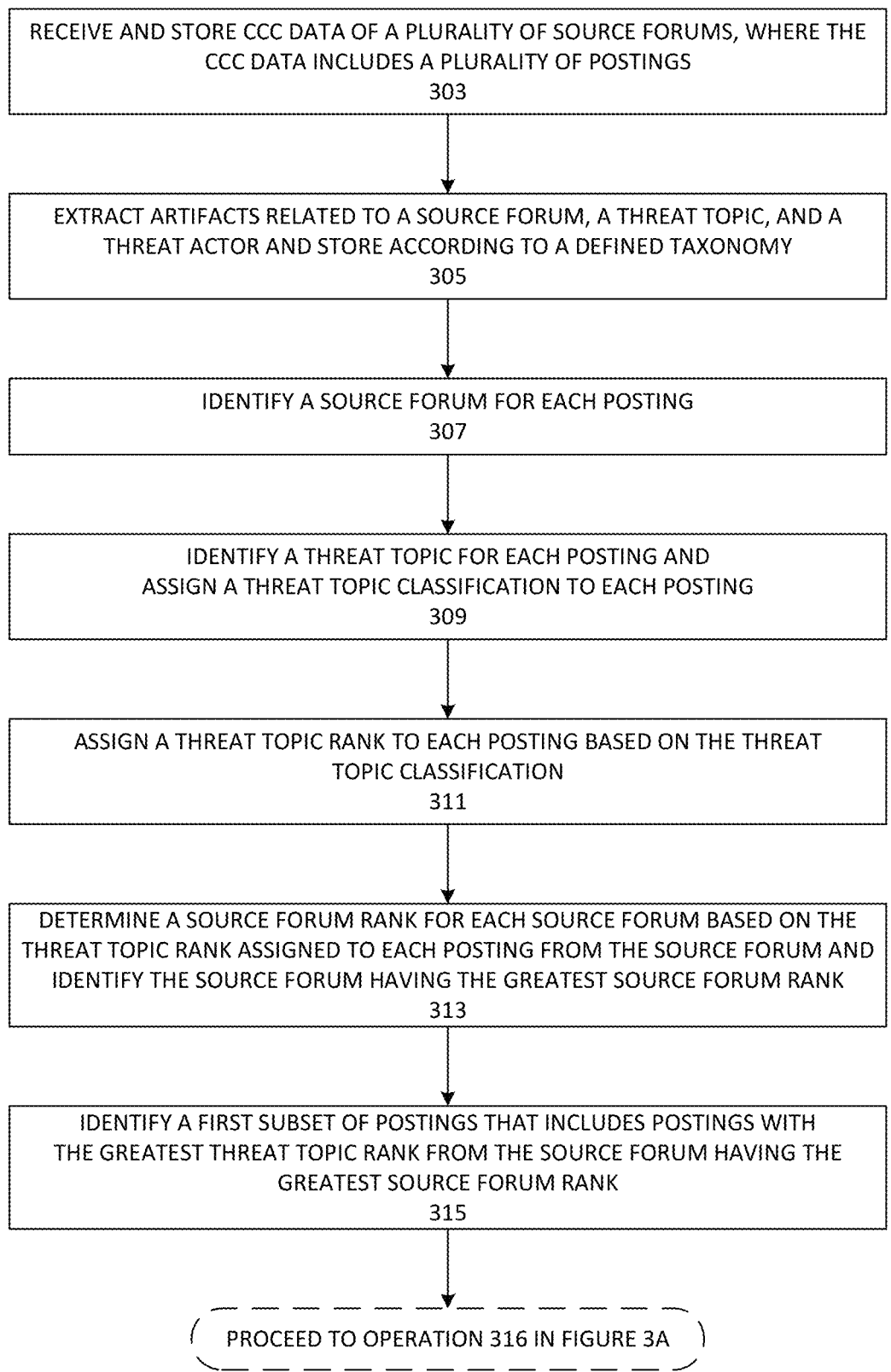
Figure 3C:
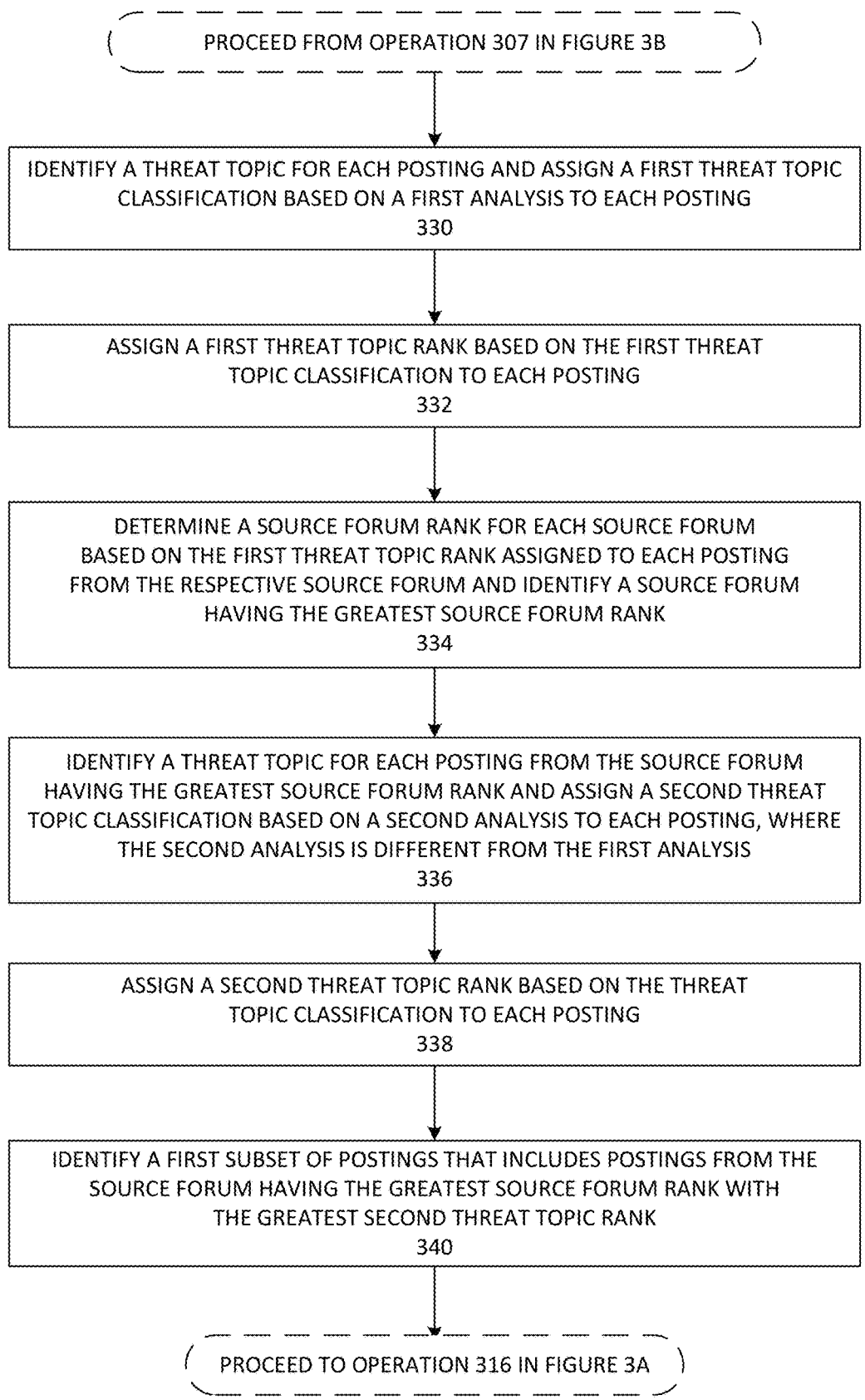

FIGS. 3A-3C are exemplary flow diagrams illustrating potential operations that may be associated with enriching cybercriminal communication data, in accordance with embodiments of the present disclosure. FIG. 3A illustrates potential operations that may be associated with enriching cybercriminal communication data received from a single source forum (e.g., one particular source forum) or that has been identified as being from a single source forum. The one or more operations may be performed by the cyber intelligence enrichment module 104. At 304, CCC data of a source forum is received and stored, for example, on disk storage. The CCC data includes a plurality of postings made in the source forum by a plurality of threat actors. The CCC data for a posting may include the complete posting thread (e.g., the posting by the threat actor and any responses to the posting by other threat actors). The CCC data may be retrieved or scraped from the dark web or from other cybercriminal communication channels. At 306, artifacts are extracted from the CCC data and stored on disk storage according to a defined taxonomy. The extracted artifacts indicate a source forum, a threat topic, or a threat actor related to an individual posting. At 308, a threat topic is identified for each posting. The threat topic may be identified from the extracted artifacts or from the CCC data. At 310, a threat topic classification is assigned to each posting. In some embodiments, the threat topic classification is assigned by analyzing each posting using an NLP algorithm. In some embodiments, the threat topic classification is assigned by analyzing each posting using a keyword topic list. In some embodiments, the threat topic classification assigned using keyword topic list is based on calculating a threat topic score which is determined from the keyword topic list analysis. At 312, a threat topic rank is assigned to each posting based on the threat topic classification. At 314, a first subset of postings is identified where the first subset of postings includes the postings with the greatest threat topic rank. At 316, a threat actor is identified for each posting in the first subset of postings. The threat actor may be identified from the extracted artifacts or from the CCC data. At 318, a threat actor rank is assigned to each threat actor identified in the first subset of postings. The threat actor rank may be assigned based on one or more of the OFR of the threat actor for the source forum, the PA score of the threat actor, and the third-mentions (i.e., the number of times the threat actor is mentioned in postings by other threat actors). In some embodiments, the threat actor rank is equal to the OFR multiplied by the PA score plus the third-mentions. At 320, a second subset of postings is identified from the first subset of postings where the second subset of postings includes postings of the threat actor having the greatest threat actor rank. In some embodiments, the second subset of postings includes postings made by the threat actor having the greatest threat actor rank. In some embodiments, the second subset of postings further includes postings associated with the threat actor, such as the third-mention postings that are not part of the threat actor's posting thread. At 322, the CCC data of the second subset of postings and associated enriched data is sent or transmitted to a cybersecurity data exchange module. The associated enriched data may include one or more of the source forum, the threat topic classification, the threat topic rank, the threat actor, the threat actor rank, and the other threat actors that mentioned the threat actor. In some embodiments, a request to query the CCC data may be received from a requestor and the query results, which include the CCC data and the associated enriched data, are sent to the requestor in response to the query request, as described below with reference to FIG. 10.

FIG. 3B illustrates potential operations that may be associated with enriching cybercriminal communication data received from a plurality of source forums or that has been identified as being from multiple source forums. FIG. 3B shares operations with FIG. 3A beginning at operation 316. The one or more operations may be performed by the cyber intelligence enrichment module 104. At 303, CCC data of a plurality of source forums is received and stored. The CCC data includes a plurality of postings made in the plurality of source forums by a plurality of threat actors. The CCC data for a posting may include the complete posting thread (e.g., the posting by the threat actor and any responses to the posting by other threat actors). The CCC data may be retrieved or scraped from the dark web or from other cybercriminal communication channels. At 305, artifacts related to a source forum, a threat topic, and threat actor associated with a posting are extracted from the CCC data and stored on disk according to a defined taxonomy. In some embodiments, the extracted artifacts are stored on disk storage in the database with the CCC data. At 307, a source forum for each posting of the plurality of postings is identified. The source forum may be identified from the artifacts related to the source forum that were extracted from the particular posting or from the CCC data of the particular posting. At 309, a threat topic for each posting is identified and assigned a threat topic classification. In some embodiments, the threat topic classification is assigned by analyzing each posting using an NLP algorithm. In some embodiments, the threat topic classification is assigned by analyzing each posting using a keyword topic list. In some embodiments, the threat topic classification assigned using keyword topic list is based on calculating a threat topic score which is determined from the keyword topic list analysis. At 311, a threat topic rank is assigned to each posting based on the threat topic classification. At 313, a source forum rank is determined for each source forum based on the threat topic rank assigned to each posting from that particular source forum and a source forum having the greatest source forum rank is identified. At 315, a first subset of postings is identified. The first subset of postings includes postings from the source forum having the greatest source forum rank and the greatest threat topic rank. After operation 315, the process continues to operation 316 through 322 of FIG. 3A.

FIG. 3C illustrates potential operations that may be associated with enriching cybercriminal communication data received from a plurality of source forums or that has been identified as being from multiple source forums and assigning a threat topic classification using a first analysis and a second analysis. FIG. 3C shares operations 301 through 307 with FIG. 3B and shares operations 316 through 322 with FIG. 3A. The one or more operations may be performed by the cyber intelligence enrichment module 104. After operations 301 through 307 in FIG. 3B are completed, the process continues with operation 330. At 330, a threat topic is identified for each posting of the plurality of postings and a first threat topic classification is assigned to each posting, where the first threat topic classification is based on a first analysis. In some embodiments, the first analysis includes analyzing each posting using an NLP algorithm, such as Named Entity Recognition, Sentiment Analysis, Text Summarization, Aspect Mining, or Topic Modeling, or an other non-biased search criteria In some embodiments, the first analysis includes analyzing each posting using a threat topic classification keyword list. At 332, a first threat topic rank is assigned to each posting based on the first threat topic classification. At 334, a source forum rank is determined for each source forum based on the first threat topic rank assigned to each posting from that particular source forum and a source forum having the greatest source forum rank is identified. At 336, a threat topic is identified for each posting of the plurality of postings from the source forum having the greatest source forum rank and a second threat topic classification is assigned to each posting, where the second threat topic classification is based on a second analysis that is different from the first analysis. In some embodiments, where the first analysis includes analyzing each posting using an NLP algorithm or an other non-biased search criteria, the second analysis includes analyzing each posting using a threat topic classification keyword list. In some embodiments, where the first analysis includes analyzing each posting using a threat topic classification keyword list, the second analysis includes analyzing each posting using an NLP algorithm or an other non-biased search criteria. In some embodiments, where the first analysis includes analyzing each posting using an NLP algorithm, the second analysis includes analyzing each posting using a non-biased search criteria different from the NLP algorithm. At 338, a second threat topic rank is assigned to each posting from the source forum having the greatest source forum rank based on the second threat topic classification. At 340, a first subset of postings is identified. The first subset of postings includes postings from the source forum having the greatest source forum rank and the greatest second threat topic rank. After operation 340, the process continues to operation 316 through 322 of FIG. 3A.

FIG. 4 is a table illustrating exemplary artifacts extracted from cybercriminal communication data, in accordance with various embodiments of the present disclosure. Artifacts that indicate a source forum, a threat topic, or a threat actor may be extracted from the CCC data. The extracted artifacts may be used to identify and rank a source forum, a threat topic, and a threat actor. In some embodiments, the artifacts may be used to identify and rank threat topics for each source forum of a plurality of source forums. In some embodiments, a source forum may be prioritized for further analysis based on the associated threat topic rankings of that source forum. In some embodiments, a threat actor may be identified for each of the threat topics associated with the source forum and assigned a threat actor ranking. As shown in the examples in FIG. 4, the source forum related artifacts may include a source forum identifier, an activity level of the source forum, and the OFR system of the source forum, among others. The threat topic related artifacts may include Malware name/description, Malware Hashes/Unique Identification (ID), IP addresses/Partial IP addresses, Target ID/Description, URLs, Credit Card data, Credential data, Social Security Numbers/Other Unique IDs, and Common Vulnerability and Exploit (CVE) mentioning, among others. The threat actor related artifacts may include Moniker, Email address/contact information, Personal encryption key (e.g., Pretty Good Privacy (PGP) key), JabberID, ICQ (I Seek U identifier), Telegram accounts, Skype accounts, Bitcoin/Altcoin addresses, Contacts List, Interests, Timestamps of postings, Message Body of postings, Ranking on Source Forum, and Most Active Topic, among others. The artifacts listed in FIG. 4 are examples and the lists are not meant to be comprehensive, such that as new artifacts are developed and used by source forums and threat actors, new artifacts will be added to the lists. Further, the extracted artifacts may be related to more than one of the identified categories. For example, timestamps of a threat actor's postings may be related to the source forum as well as the threat actor.

FIG. 5A is a table illustrating exemplary threat topic classifications, in accordance with various embodiments of the present disclosure. As shown in the examples in FIG. 5A, malware classifications may include Ransomware, Banking Trojans, Phishing Kits, Information Stealers, Exploit Kits, Botnets, Remote Administration Tools (RAT) Tools, Point-of-Sale (PoS) Tools, Skimming Tools, CVE-Exploit Sale, Crypter Services, and Counter AV Services, among others. Hacking classifications may include Corporate access for sale, Websites for sale, and Remote Desktop Protocol (RDP) systems for sale, among others. Fraud classifications may include credit cards, bank accounts, and customer accounts, among others. Anonymity Provider classifications may include Virtual Private Networks (VPN) and Socks, among others. Financial Logistics Provider classifications may include Money Mule services, bitcoin mixing, and reshipping, among others. Bulletproof Hosting classifications may include Bulletproof Service Providers, among others. Moderator classification may include disputes-arguments and product review, among others. The threat topic classifications listed in FIG. 5A are examples and the lists are not meant to be comprehensive, such that as new threat topics are developed and identified, new threat topic classifications will be added.

FIG. 5B is a table illustrating exemplary keyword lists for two threat topic classifications of FIG. 5A, in accordance with various embodiments of the present disclosure. The keyword lists may be used to assign a threat topic classification to a posting based on the number of keyword topic list matches in a posting (e.g., calculating a threat topic score per classification based on the number of keyword matches and assigning the threat topic classification having the greatest threat topic score). As shown in the examples in FIG. 5B, the keyword list for ransomware may include the terms dharma, offline cryptoclocker, bugs fixed, code rewritten, reflective_dll, powershell, rigs, bundles, metasploit, Windows, C, dependencies, multithreaded encryption, encrypt/encryption, scan/scanning, edit/edited/editing, .exe, 86 kb, .dll, 89 kb, 10 mb, AES, AES256 algorithm, RSA encryption algorithm, RSA 2048 algorithm, disks, local drives, hard drives, flash drives, network drives, system files, directory, databases, resources, files, unique key/encrypted key/unique user ID/create ID, PC, memory, Locker, program/program blocking, function, full/complete, headers, note, stream, and HDD, among others. The keyword list for CVE-Exploit Sale may include Local Privilege Escalation (LPE), exploit, CVE, CVE-2019-1069, local privilege escalation, system level, Windows 10, Server 2016/2019, versions 1903, vulnerability, target/targeted, login/password, current account, account, user rights, User Account Control (UAC), bypassed, Proof of Concept (POC), network, operation, modules, debugged, tested, conditions, KTS 2019, Avast IS 2019, ESET File Security 7.1.12006, USD BTC Guarantee, contacts, and communication, among others. The keyword lists for the threat topic classifications in FIG. 5B are examples and the lists are not meant to be comprehensive, such that as new threat topics are developed and identified, new keywords may be added to the threat topic classification keyword lists.

Figure 6C:
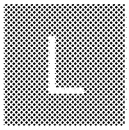

FIGS. 6A-6C are exemplary threat topic classifications of CCC postings using keyword lists, in accordance with an embodiment of the present disclosure. FIG. 6A depicts a Crypto Locker (Ransomware) posting by Scoorge, who has an OFR of affiliate on the source forum. The Scoorge posting has been analyzed using a keyword list for Ransomware as shown in FIG. 5B and the matching keywords are underlined and indicate 50 matches for a threat topic score of 50. In some embodiments, a posting is assigned a threat topic classification based on the threat topic score being above a threshold. In some embodiments, a threat topic score is assigned to each threat topic classification using the associated keyword list and the posting is assigned the threat topic classification having the greatest threat topic score. For example, based on the threat topic score from the keyword list matches and/or a comparison of threat topic scores of other threat topic keyword lists, the Scoorge posting is assigned the threat topic classification of Ransomware.

FIG. 6B depicts a Crypto Locker posting by ketstorm, who has an OFR of ransomware partner on the source forum. The ketstorm posting includes responses from two other threat actors, one from nextbuxs and one from craigallen06, who both mention Scoorge (e.g., third-mentions) in their responses. The ketstorm posting has been analyzed using a keyword list for Ransomware as shown in FIG. 5B and the matching keywords are underlined and indicate 40 matches for a threat topic score of 40. Based on the threat topic score from the keyword list matches and/or a comparison of threat topic scores of other threat topic keyword lists, the ketstorm posting is assigned the threat topic classification of Ransomware.

FIG. 6C depicts a CVE-Exploit Sale posting by luxoret2008, who has an OFR of seller on the source forum. The luxoret2008 posting includes response from two other threat actors, one from nextbuxs and one from craigallen06. The luxoret2008 posting has been analyzed using a keyword list for CVE-Exploit Sale as shown in FIG. 5B and the matching keywords are underlined and indicate 40 matches for a threat topic score of 40. Based on the threat topic score from the keyword list matches and/or a comparison of threat topic scores of other threat topic keyword lists, the luxoret2008 posting is assigned the threat topic classification of CVE-Exploit Sale.

Figure 7:
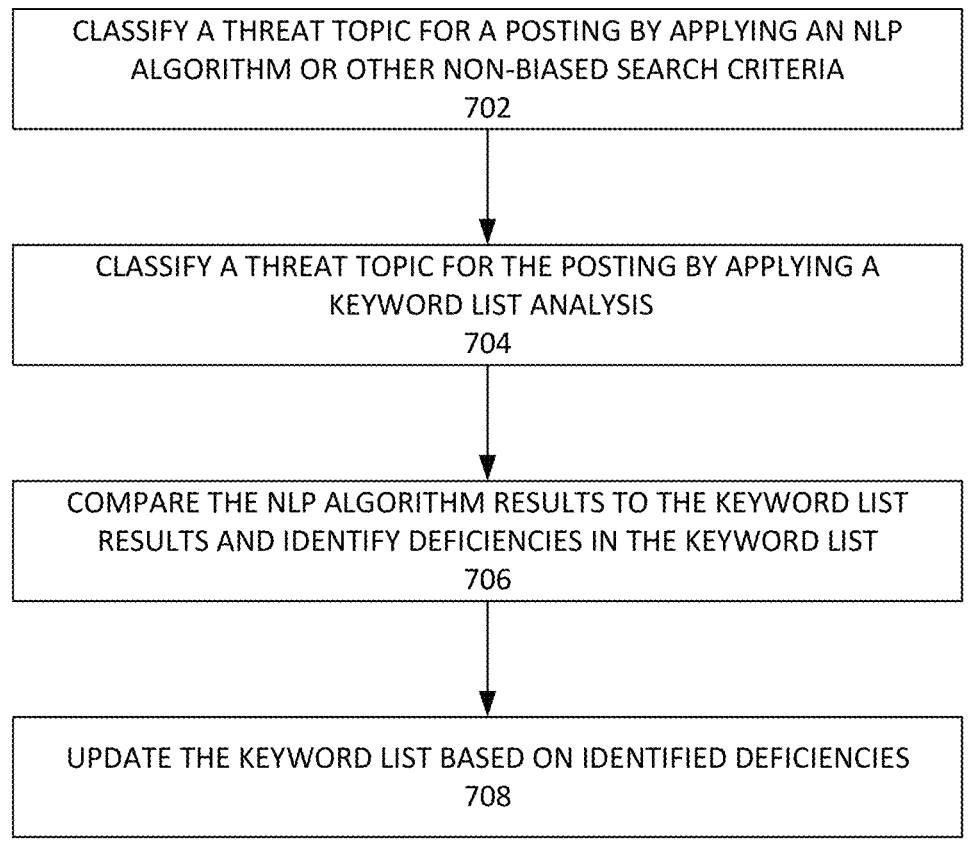
FIG. 7 is a simplified flow diagram illustrating potential operations that may be associated with updating a keyword list for a threat topic classification, in accordance with various embodiments of the present disclosure.

FIG. 7 is a simplified flow diagram illustrating potential operations that may be associated with updating a keyword list for a threat topic classification, in accordance with an embodiment of the present disclosure. The use of keyword lists for threat topic classification allows for adding new threat topic classifications, for updating existing threat topic classifications, and for translating the keyword lists into different languages. In some embodiments, new threat topics and associated terms may be added to the keyword lists for a particular threat topic classification. In some embodiments, the keyword list may be updated by comparing the results from an NLP analysis to the results from a keyword list analysis and identifying deficiencies with the keyword list. At 702, a posting is analyzed using an NLP algorithm or other non-biased search criteria and assigned a threat topic classification based on the NLP algorithm results. At 704, the posting is analyzed using a keyword topic list and assigned a threat topic classification based on the keyword list results. At 706, the NLP algorithm results and the keyword list results are compared to identify deficiencies in the keyword list. In some embodiments, the deficiencies are determined by identifying where the NLP algorithm results and the keyword list results are the same and where the NLP algorithm results and the keyword list results are different. For example, the NLP algorithm results and the keyword list results may be displayed in a Venn diagram where the overlapping region indicates the same results and the non-overlapping regions indicate the different results. At 708, the keyword list may be updated based on the identified deficiencies. The operations 702 through 708 may be repeated for each threat topic classification keyword list.

FIG. 8A is a table illustrating exemplary official forum rankings for a source forum with assigned numerical values, in accordance with various embodiments of the present disclosure. As shown in FIG. 8A, the exemplary source forum internal ranking system has 13 ranks or levels including, from highest rank to lowest rank, Owner, Admin, S-Moderator, Moderator, Seller, Developer, VIP, Legend, Elite Member, Elite, S-Member, Member, and Paid Member. A numerical value has been assigned to each OFR starting with 1 for a Paid Member, the lowest rank, and increasing the numerical value by 1 for each incremental rank, and ending with 13 for an Owner, the highest rank. The assigned OFR numerical value may be used to assign a threat actor rank.

FIG. 8B is a table illustrating exemplary posting activity scores for a threat actor, in accordance with various embodiments of the present disclosure. A threat actor's PA score indicates the threat actor's posting presence on a particular source forum. The PA score may be determined based on how often the threat actor has posted on the source forum, how recently the threat actor has posted on the source forum, or how often and how recently the threat actor has posted on the source forum. For example, the PA score may be assigned based on a total number of postings (e.g., TA1 has 7 postings and TA2 has 5 postings) or based on a total number over a period of time (e.g., since January 2017, TA1 has 0 postings and TA2 has 5 postings). In another example, the PA score may be determined using a weighted average of a number of times the threat actor posted and a date or an age of the threat actor's postings, where more recent postings are given a higher score and less recent postings are given a lower score. As shown in the example in FIG. 8B, postings made between January 2010 and December 2012 are assigned a PA weight value of 1, postings made between January 2013 and December 2014 are assigned a PA weight value of 2, postings made between January 2015 and December 2016 are assigned a PA weight value of 3, postings made between January 2017 and December 2018 are assigned a PA weight value of 4, and postings made between January 2019 and December 2020 are assigned a PA weight value of 5. Threat actor 1 (TA1) made 6 postings between January 2010 and December 2012 and 1 posting between January 2015 and December 2016 for a PA score of 9 (i.e., (6×1)+(1×3)=9). Threat actor 2 (TA2) made 2 postings between January 2017 and December 2018 and 3 postings between January 2019 and December 2020 for a PA score of 23 (i.e., (2×4)+(3×5)=23). In some embodiments, the PA score may be compared to a threshold value, which may be determined based on selected criteria and risk levels, where a PA score below the threshold is assigned a low score indicating a low risk or low priority and a PA score above the threshold is assign a high score indicating a high risk or a high priority. As shown in the example in FIG. 8B, based on a threshold of 14 and TA1 is assigned a low PA score and TA2 is assigned a high PA score.

FIG. 8C is a table illustrating exemplary threat actor rank calculations, in accordance with various embodiments of the present disclosure. The threat actor may be assigned a threat actor rank based on one or more of the OFR, the PA score, and the third-mentions. The third-mentions may be determined based on identifying a number of times the threat actor is mentioned in posts by other threat actors on the source forum. The third-mentions may be identified by searching the CCC data from the source forum for the threat actor identifier (e.g., moniker or username) and counting the number of posts by other threat actors that mention the threat actor. In some embodiments, the threat actor rank is equal to the OFR multiplied by the PA score plus the third-mentions. As shown in the example in FIG. 8C, TA1 has an OFR of 11, a PA score of 9, and 0 third-mentions for a calculated threat actor rank of 99, and TA2 has an OFR of 8, a PA score of 23, and 2 third-mentions for a calculated threat actor rank of 186. The threat actor ranks may be compared to identify TA2 as having the greatest threat actor rank.

Figure 9:
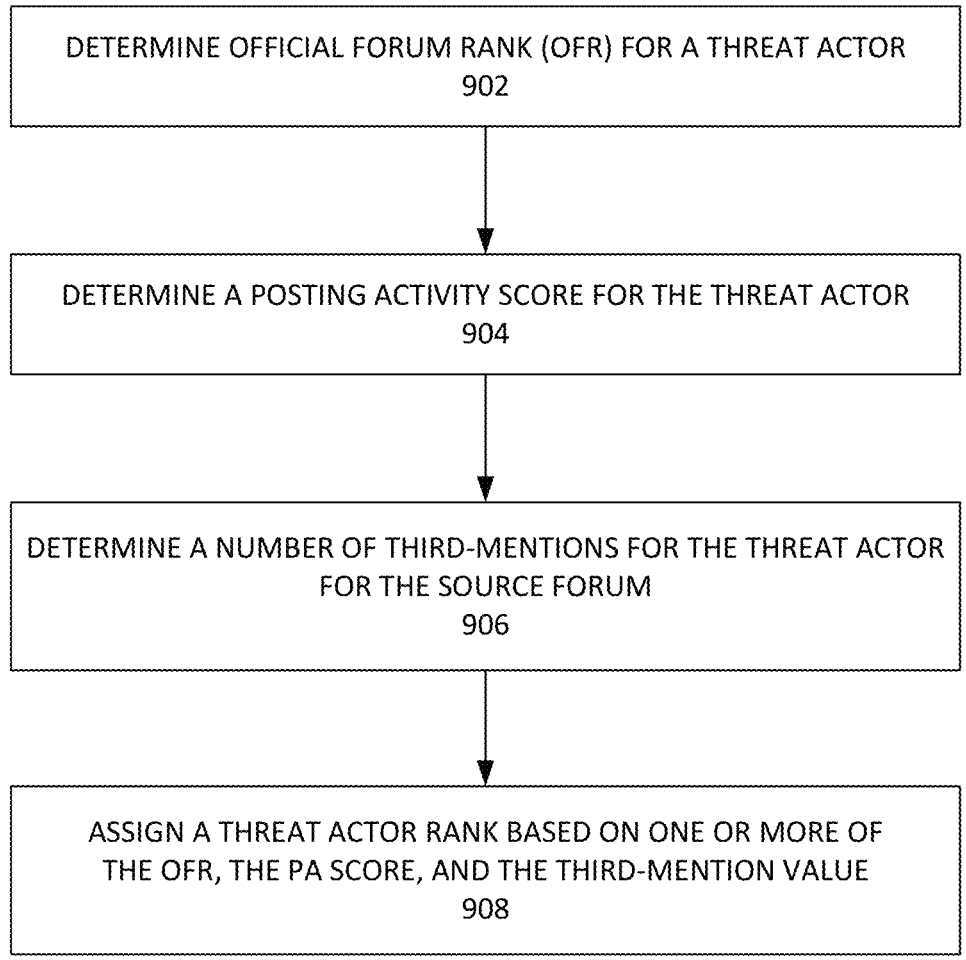
FIG. 9 is a simplified flow diagram illustrating potential operations that may be associated with assigning a threat actor rank to a threat actor, in accordance with various embodiments of the present disclosure.

FIG. 9 is a simplified flow diagram illustrating potential operations that may be associated with assigning a threat actor rank to a threat actor, in accordance with an embodiment of the present disclosure. The one or more operations may be performed by the cyber intelligence enrichment module 104. At 902, an OFR is determined for a threat actor. The OFR may be retrieved from the source forum, or may be assigned an OFR value, as described above with reference to FIG. 8A. At 904, a PA score is determined for the threat actor. The PA score may be determined, as described above with reference to FIG. 8B. At 906, a number of third-mentions for the threat actor on the source forum is determined. At 908, a threat actor rank is assigned based on one or more of the OFR, the PA score, and the third-mention value. In some embodiments, the threat actor rank is calculated, as described above with reference to FIG. 8C.

Figure 10:
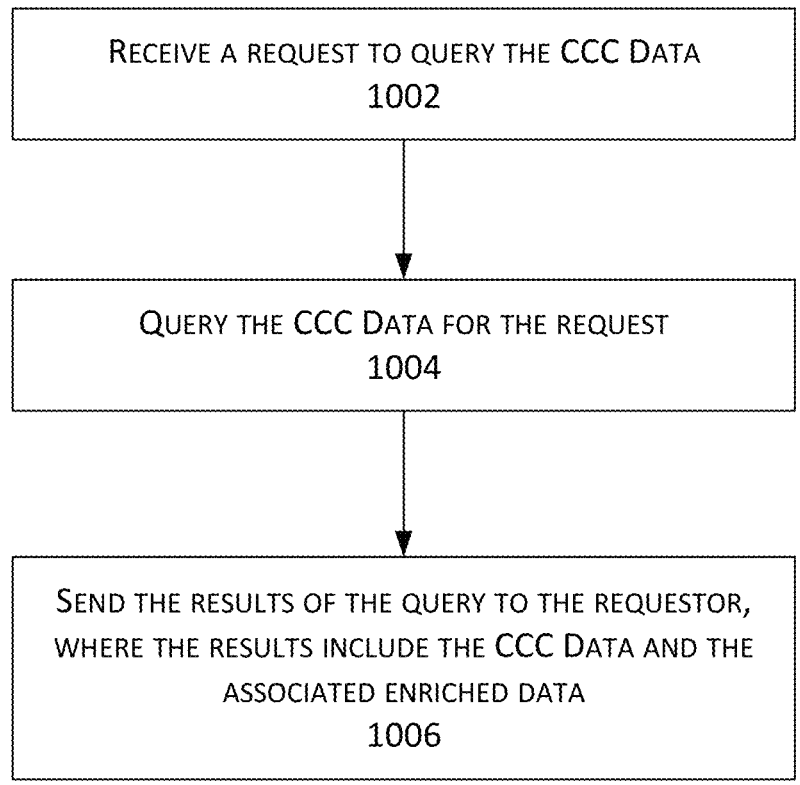
FIG. 10 is a simplified flow diagram illustrating potential operations that may be associated with responding to a request to query the cybercriminal communication data, in accordance with various embodiments of the present disclosure.

FIG. 10 is a simplified flow diagram illustrating potential operations that may be associated with responding to a request to query the cybercriminal communication data, in accordance with an embodiment of the present disclosure. The one or more operations may be performed by the cyber intelligence enrichment module 104. At 1002, a request to query the CCC data is received. At 1004, the CCC data is queried per the request. In some embodiments, both the CCC data and the enriched data are queried. At 1006, the query results are sent or transmitted to the requestor. The query results include a portion of the CCC data and associated enriched data, where the associated enriched data includes one or more of the source forum, the threat topic classification, the threat topic rank, the threat actor, the threat actor rank, and the other threat actors that mention the threat actor (i.e., third-mentions). In some embodiments, the query results may have a specialized output or format as instructed by the request.

Figure 11:
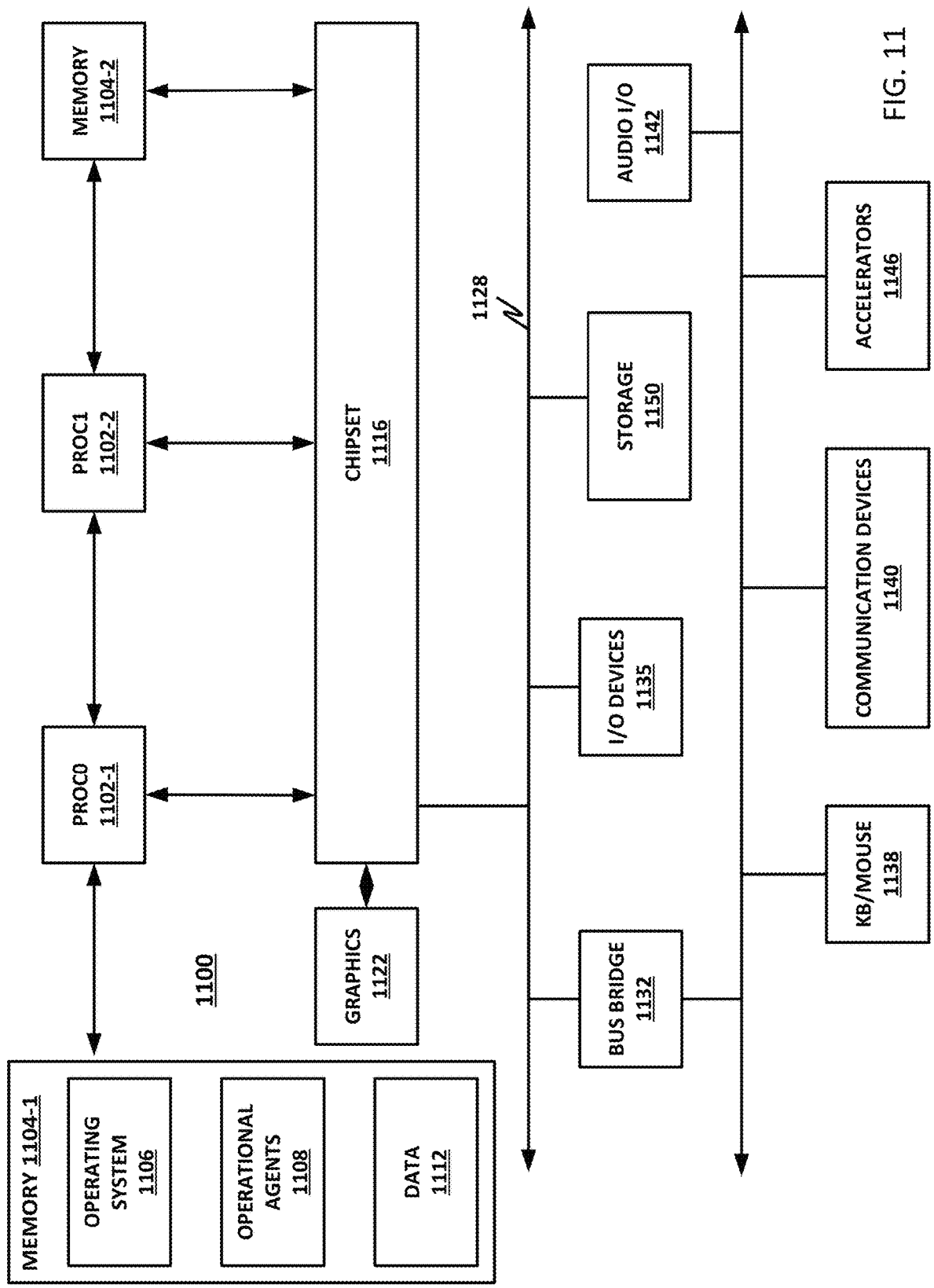
FIG. 11 is a block diagram of selected elements of a hardware platform.

FIG. 11 is a block diagram of a hardware platform 1100. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 1100, even though they may be scattered across a data center, or even located in different data centers.

Hardware platform 1100 is configured to provide a computing device. In various embodiments, a "computing device" may be or comprise, by way of nonlimiting example, a computer, workstation, server, mainframe, virtual machine (whether emulated or on a "bare-metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 1100 is arranged in a point-to-point (PtP) configuration. This PtP configuration is popular for personal computer (PC) and server-type devices, although it is not so limited, and any other bus type may be used.

Hardware platform 1100 is an example of a platform that may be used to implement embodiments of the teachings of this specification. For example, instructions could be stored in storage 1150. Instructions could also be transmitted to the hardware platform in an ethereal form, such as via a network interface, or retrieved from another source via any suitable interconnect. Once received (from any source), the instructions may be loaded into memory 1104, and may then be executed by one or more processor 1102 to provide elements such as an operating system 1106, operational agents 1108, or data 1112.

Hardware platform 1100 may include several processors 1102. For simplicity and clarity, only processors PROC0 1102-1 and PROC1 1102-2 are shown. Additional processors (such as 2, 4, 8, 16, 24, 32, 64, or 128 processors) may be provided as necessary, while in other embodiments, only one processor may be provided. Details of processors 1102 are not illustrated in this FIGURE. Processors may have any number of cores, such as 1, 2, 4, 8, 16, 24, 32, 64, or 128 cores.

Processors 1102 may be any type of processor and may communicatively couple to chipset 1116 via, for example, PtP interfaces. Chipset 1116 may also exchange data with other elements, such as a high-performance graphics adapter 1122. In alternative embodiments, any or all of the PtP links illustrated in FIG. 7 could be implemented as any type of bus, or other configuration rather than a PtP link. In various embodiments, chipset 1116 may reside on the same die or package as a processor 1102 or on one or more different dies or packages. Each chipset may support any suitable number of processors 1102. A chipset 1116 (which may be a chipset, uncore, Northbridge, Southbridge, or other suitable logic and circuitry) may also include one or more controllers to couple other components to one or more CPUs.

Two memories, 1104-1 and 1104-2 are shown, connected to PROC0 1102-1 and PROC1 1102-2, respectively. As an example, each processor is shown connected to its memory in a direct memory access (DMA) configuration, though other memory architectures are possible, including ones in which memory 1104 communicates with processor 1102 via a bus. For example, some memories may be connected via a system bus, or in a data center, memory may be accessible in a remote DMA (RDMA) configuration.

Memory 1104 may include any form of volatile or non-volatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 1104 may be used for short, medium, and/or long-term storage. Memory 1104 may store any suitable data or information utilized by platform logic. In some embodiments, memory 1104 may also comprise storage for instructions that may be executed by the cores of processors 1102 or other processing elements (e.g., logic resident on chipsets 1116) to provide functionality.

In certain embodiments, memory 1104 may comprise a relatively low-latency volatile main memory, while storage 1150 may comprise a relatively higher-latency nonvolatile memory. However, memory 1104 and storage 1150 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 1104 and storage 1150, for example, in a single physical memory device, and in other cases, memory 1104 and/or storage 1150 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 1122 may be configured to provide a human-readable visual output, such as a command-line interface (CLI) or graphical desktop such as Microsoft Windows, Apple OSX desktop, or a Unix/Linux X Window System-based desktop. Graphics adapter 1122 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 1122 may include a hardware graphics card, which may have its own memory and its own graphics processing unit (GPU).

Chipset 1116 may be in communication with a bus 1128 via an interface circuit. Bus 1128 may have one or more devices that communicate over it, such as a bus bridge 1132, I/O devices 1135, accelerators 1146, communication devices 1140, and a keyboard and/or mouse 1138, by way of nonlimiting example. In general terms, the elements of hardware platform 1100 may be coupled together in any suitable manner. For example, a bus may couple any of the components together. A bus may include any known interconnect, such as a multi-drop bus, a mesh interconnect, a fabric, a ring interconnect, a round-robin protocol, a point-to-point interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 1140 can broadly include any communication not covered by a network interface and the various I/O devices described herein. This may include, for example, various USB, FireWire, Lightning, or other serial or parallel devices that provide communications.

I/O Devices 1135 may be configured to interface with any auxiliary device that connects to hardware platform 1100 but that is not necessarily a part of the core architecture of hardware platform 1100. A peripheral may be operable to provide extended functionality to hardware platform 1100, and may or may not be wholly dependent on hardware platform 1100. In some cases, a peripheral may be a computing device in its own right. Peripherals may include input and output devices such as displays, terminals, printers, keyboards, mice, modems, data ports (e.g., serial, parallel, universal serial bus (USB), Firewire, or similar), network controllers, optical media, external storage, sensors, transducers, actuators, controllers, data acquisition buses, cameras, microphones, speakers, or external storage, by way of nonlimiting example.

In one example, audio I/O 1142 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 1132 may be in communication with other devices such as a keyboard/mouse 1138 (or other input devices such as a touch screen, trackball, etc.), communication devices 1140 (such as modems, network interface devices, peripheral interfaces such as PCI or PCIe, or other types of communication devices that may communicate through a network), audio I/O 1142, and/or accelerators 1146. In alternative embodiments, any portions of the bus architectures could be implemented with one or more PtP links.

Operating system 1106 may be, for example, Microsoft Windows, Linux, UNIX, Mac OS X, iOS, MS-DOS, or an embedded or real-time operating system (including embedded or real-time flavors of the foregoing). In some embodiments, a hardware platform 1100 may function as a host platform for one or more guest systems that invoke application (e.g., operational agents 1108).

Operational agents 1108 may include one or more computing engines that may include one or more non-transitory computer-readable mediums having stored thereon executable instructions operable to instruct a processor to provide operational functions. At an appropriate time, such as upon booting hardware platform 1100 or upon a command from operating system 1106 or a user or security administrator, processor 1102 may retrieve a copy of the operational agent (or software portions thereof) from storage 1150 and load it into memory 1104. Processor 1102 may then iteratively execute the instructions of operational agents 1108 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 1100 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 1100 may be virtualized, in particular the processor(s) and memory. For example, a virtualized environment may run on OS 1106, or OS 1106 could be replaced with a hypervisor or virtual machine manager. In this configuration, a virtual machine running on hardware platform 1100 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 11 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), field-programmable gate arrays (FPGAs), and other semiconductor chips.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a non-volatile memory. Thus, for example, an "engine" as described above could include instructions stored within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and non-limiting example, a magnetic media (e.g., hard drive), a flash memory, a read-only memory (ROM), optical media (e.g., CD, DVD, Blu-Ray), non-volatile random access memory (NVRAM), non-volatile memory (NVM) (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a non-limiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

Example Implementations

The following paragraphs provide various examples of the embodiments disclosed herein.

Example 1 is at least one non-transitory computer-readable medium comprising one or more instructions that when executed by a processor, cause the processor to receive CCC data of a source forum, wherein the CCC data includes a plurality of postings made on the source forum; store the CCC data; extract artifacts from the CCC data, wherein the extracted artifacts indicate the source forum, a threat topic, or a threat actor of a posting; store the extracted artifacts according to a pre-defined taxonomy; for each posting of the plurality of postings: identify the threat topic; assign a threat topic classification; and assign a threat topic rank based on the threat topic classification; identify a first subset of postings, wherein the first subset of postings includes postings assigned the threat topic classification with the greatest threat topic rank; for each posting of the first subset of postings: identify the threat actor; and assign a threat actor rank based at least in part on an official source forum rank (OFR), a posting activity score, or a number of times the threat actor is mentioned by other threat actors; identify a second subset of postings from the first subset of postings, wherein the second subset of postings includes postings made by and associated with the threat actor assigned the greatest threat actor rank; and send, to a cybersecurity data exchange module, the CCC data of the second subset of postings and associated enriched data, wherein the associated enriched data includes one or more of the source forum, the threat topic classification, the threat topic rank, the threat actor, the threat actor rank, and the other threat actors that mentioned the threat actor.

Example 2 may include the subject matter of Example 1, and may further specify that the source forum is one of a plurality of source forums and the CCC data is received from the plurality of source forums, and may further include one or more instructions that when executed by the processor, cause the processor to: for each posting of the plurality of postings from each source forum: identify the source forum; for each source forum of the plurality of source forums: determine a source forum rank for the source forum based on the threat topic rank assigned to each posting of the plurality of postings from the source forum; identify the source forum having the greatest source forum rank; and wherein the first subset of postings is identified from the source forum having the greatest forum rank.

Example 3 may include the subject matter of Examples 1 and 2, and may further specify that assign the threat topic classification includes analyzing each posting using a Natural Language Processing (NLP) algorithm.

Example 4 may include the subject matter of any of Examples 1-3, and may further specify that assign the threat topic classification includes analyzing each posting using a keyword topic list.

Example 5 may include the subject matter of Example 4, and may further include one or more instructions that when executed by the processor, cause the processor to: calculate a threat topic score based on the keyword topic list analysis; and assign the threat topic classification based on the threat topic score.

Example 6 may include the subject matter of any of Examples 1-5, and may further specify that the posting activity score is determined using a weighted average based on a number of postings and a date of postings.

Example 7 may include the subject matter of any of Examples 1-6, and may further specify that the threat actor rank is equal to the OFR multiplied by the posting activity score added to the number of times the threat actor is mentioned by other threat actors.

Example 8 may include the subject matter of any of Examples 1-7, and may further include one or more instructions that when executed by the processor, cause the processor to: receive a request from a requestor to query the CCC data; query the CCC data for the request; and send the query results to the requestor, wherein the query results include a portion of the CCC data and the associated enriched data, wherein the associated enriched data includes one or more of the source forum, the threat topic classification, the threat topic rank, the threat actor, the threat actor rank, and the other threat actors that mentioned the threat actor.

Example 9 is an apparatus, including on or more memory elements operable to store instructions; and one or more processors operable to execute the instructions, such that the apparatus is configured to: receive CCC data of a plurality of source forums, wherein the CCC data of each source forum of the plurality of source forums includes a plurality of postings made on the respective source forum; store the CCC data; extract artifacts from the CCC data, wherein the extracted artifacts indicate the source forum, a threat topic, or a threat actor of a posting; store the extracted artifacts according to a pre-defined taxonomy; for each posting of the plurality of postings of each source forum: identify the source forum; identify the threat topic; assign a threat topic classification; and assign a threat topic rank based on the threat topic classification; for each source forum of the plurality of source forums: determine a source forum rank for the source forum based on the threat topic rank assigned to each posting of the plurality of postings from the source forum; identify the source forum having the greatest source forum rank; identify a first subset of postings from the source forum having the greatest forum rank, wherein the first subset of postings includes postings assigned the threat topic classification with the greatest threat topic rank; for each posting of the first subset of postings: identify the threat actor; and assign a threat actor rank based at least in part on an official source forum rank (OFR), a posting activity score, or a number of times the threat actor is mentioned by other threat actors; identify a second subset of postings from the first subset of postings, wherein the second subset of postings includes postings associated with the threat actor assigned the greatest threat actor rank; and send, to a cybersecurity data exchange module, the CCC data of the second subset of postings and associated enriched data, wherein the associated enriched data includes one or more of the source forum, the threat topic classification, the threat topic rank, the threat actor, the threat actor rank, and the other threat actors that mentioned the threat actor.

Example 10 may include the subject matter of Example 9, and may further specify that assign the threat topic classification includes analyzing each posting using a Natural Language Processing (NLP) algorithm.

Example 11 may include the subject matter of any of Examples 9 and 10, and may further specify that assign the threat topic classification includes analyzing each posting using a keyword topic list.

Example 12 may include the subject matter of Example 11, and may be further configured to calculate a threat topic score based on the keyword topic list analysis; and assign the threat topic classification based on the threat topic score.

Example 13 may include the subject matter of any of Examples 9-12, and may further specify that the posting activity score is determined using a weighted average based on a number of postings and a date of postings made by the threat actor on the source forum.

Example 14 may include the subject matter of any of Examples 9-13, and may further specify that the threat actor rank is equal to the OFR multiplied by the posting activity score added to the number of times the threat actor is mentioned by other threat actors on the source forum.

Example 15 may include the subject matter of any of Examples 9-14, and may be further configured to: receive a request from a requestor to query the CCC data; query the CCC data for the request; and send the query results to the requestor, wherein the query results include a portion of the CCC data and the associated enriched data, wherein the associated enriched data includes one or more of the source forum, the threat topic classification, the threat topic rank, the threat actor, the threat actor rank, and the other threat actors that mentioned the threat actor.

Example 16 is a method, including: receiving CCC data of a plurality of source forums, wherein the CCC data of each source forum of the plurality of source forums includes a plurality of postings made on the respective source forum; storing the CCC data; extracting artifacts from the CCC data, wherein the extracted artifacts indicate the source forum, a threat topic, or a threat actor of a posting; storing the extracted artifacts according to a pre-defined taxonomy; for each posting of the plurality of postings: identifying the source forum; assigning a first threat topic classification based on a first analysis; and assigning a first threat topic rank based on the first threat topic classification; for each source forum of the plurality of source forums: determining a source forum rank for the source forum based on the first threat topic rank assigned to each posting of the plurality of postings from the source forum; identifying the source forum having the greatest source forum rank; for each posting of the plurality of postings of the source forum having the greatest source forum rank: assigning a second threat topic classification based on a second analysis; and assigning a second threat topic rank based on the second threat topic classification; identifying a first subset of postings from the source forum having the greatest forum rank, wherein the first subset of postings includes postings assigned the second threat topic classification with the greatest second threat topic rank; for each posting of the first subset of postings: identifying the threat actor; and assigning a threat actor rank based at least in part on an official source forum rank (OFR), a posting activity score, or a number of times the threat actor is mentioned by other threat actors on the source forum; identifying a second subset of postings from the first subset of postings, wherein the second subset of postings includes postings made by the threat actor assigned the greatest threat actor rank; and sending, to a cybersecurity data exchange module, the CCC data of the second subset of postings and associated enriched data, wherein the associated enriched data includes one or more of the source forum, the threat topic classification, the threat topic rank, the threat actor, the threat actor rank, and the other threat actors that mentioned the threat actor.

Example 17 may include the subject matter of Example 16, and may further specify that the first analysis includes analyzing each posting using a Natural Language Processing (NLP) algorithm and the second analysis includes analyzing each posting using a keyword topic list.

Example 18 may include the subject matter of Example 17, and may further include calculating a threat topic score based on the keyword topic list analysis; and assigning the threat topic classification based on the threat topic score.

Example 19 may include the subject matter of any of Examples 16-18, and may further specify that the posting activity score is determined using a weighted average based on a number of postings and a date of postings made by the threat actor on the source forum.

Example 20 may include the subject matter of any of Examples 16-19, and may further specify that the threat actor rank is equal to the threat actor's OFR multiplied by the threat actor's posting activity score added to the number of times the threat actor is mentioned by other threat actors on the source forum.

The invention claimed is:

1. At least one non-transitory computer-readable medium comprising one or more instructions that when executed by a processor, cause the processor to:
   receive CCC data of a source forum, wherein the CCC data includes a plurality of postings made on the source forum;
   store the CCC data;
   extract artifacts from the CCC data, wherein the extracted artifacts indicate the source forum, a threat topic, or a threat actor of a posting;
   store the extracted artifacts according to a pre-defined taxonomy;
   for each posting of the plurality of postings:
      identify the threat topic;
      assign a threat topic classification; and
      assign a threat topic rank based on the threat topic classification;
   identify a first subset of postings, wherein the first subset of postings includes postings assigned the threat topic classification with the greatest threat topic rank;
   for each posting of the first subset of postings:
      identify the threat actor; and
      assign a threat actor rank based at least in part on an official source forum rank (OFR), a posting activity score, or a number of times the threat actor is mentioned by other threat actors;
identify a second subset of postings from the first subset of postings, wherein the second subset of postings includes postings made by and associated with the threat actor assigned the greatest threat actor rank; and
send, to a cybersecurity data exchange module, the CCC data of the second subset of postings and associated enriched data, wherein the associated enriched data includes one or more of the source forum, the threat topic classification, the threat topic rank, the threat actor, the threat actor rank, and the other threat actors that mentioned the threat actor.

2. The at least one non-transitory computer-readable medium of claim 1, wherein assign the threat topic classification includes analyzing each posting using a keyword topic list.

3. The at least one non-transitory computer-readable medium of claim 2, further comprising one or more instructions that when executed by the processor, cause the processor to:
calculate a threat topic score based on the keyword topic list analysis; and
assign the threat topic classification based on the threat topic score.

4. The at least one non-transitory computer-readable medium of claim 1, wherein the source forum is one of a plurality of source forums and the CCC data is received from the plurality of source forums, and further comprising one or more instructions that when executed by the processor, cause the processor to:
for each posting of the plurality of postings from each source forum:
identify the source forum;
for each source forum of the plurality of source forums:
determine a source forum rank for the source forum based on the threat topic rank assigned to each posting of the plurality of postings from the source forum;
identify the source forum having the greatest source forum rank; and
wherein the first subset of postings is identified from the source forum having the greatest forum rank.

5. The at least one non-transitory computer-readable medium of claim 1, wherein assign the threat topic classification includes analyzing each posting using a Natural Language Processing (NLP) algorithm.

6. The at least one non-transitory computer-readable medium of claim 1, wherein the posting activity score is determined using a weighted average based on a number of postings and a date of postings.

7. The at least one non-transitory computer-readable medium of claim 1, wherein the threat actor rank is equal to the OFR multiplied by the posting activity score added to the number of times the threat actor is mentioned by other threat actors.

8. The at least one non-transitory computer-readable medium of claim 1, further comprising one or more instructions that when executed by the processor, cause the processor to:
receive a request from a requestor to query the CCC data;
query the CCC data for the request; and
send the query results to the requestor, wherein the query results include a portion of the CCC data and the associated enriched data, wherein the associated enriched data includes one or more of the source forum, the threat topic classification, the threat topic rank, the threat actor, the threat actor rank, and the other threat actors that mentioned the threat actor.

9. An apparatus, comprising:
memory operable to store instructions; and
one or more processors operable to execute the instructions, such that the apparatus is configured to:
receive CCC data of a plurality of source forums, wherein the CCC data of each source forum of the plurality of source forums includes a plurality of postings made on the respective source forum;
store the CCC data;
extract artifacts from the CCC data, wherein the extracted artifacts indicate the source forum, a threat topic, or a threat actor of a posting;
store the extracted artifacts according to a pre-defined taxonomy;
for each posting of the plurality of postings of each source forum:
identify the source forum;
identify the threat topic;
assign a threat topic classification; and
assign a threat topic rank based on the threat topic classification;
for each source forum of the plurality of source forums:
determine a source forum rank for the source forum based on the threat topic rank assigned to each posting of the plurality of postings from the source forum;
identify the source forum having the greatest source forum rank;
identify a first subset of postings from the source forum having the greatest forum rank, wherein the first subset of postings includes postings assigned the threat topic classification with the greatest threat topic rank;
for each posting of the first subset of postings:
identify the threat actor; and
assign a threat actor rank based at least in part on an official source forum rank (OFR), a posting activity score, or a number of times the threat actor is mentioned by other threat actors;
identify a second subset of postings from the first subset of postings, wherein the second subset of postings includes postings associated with the threat actor assigned the greatest threat actor rank; and
send, to a cybersecurity data exchange module, the CCC data of the second subset of postings and associated enriched data, wherein the associated enriched data includes one or more of the source forum, the threat topic classification, the threat topic rank, the threat actor, the threat actor rank, and the other threat actors that mentioned the threat actor.

10. The apparatus of claim 9, wherein assign the threat topic classification includes analyzing each posting using a keyword topic list.

11. The apparatus of claim 10, further configured to:
calculate a threat topic score based on the keyword topic list analysis; and
assign the threat topic classification based on the threat topic score.

12. The apparatus of claim 9, wherein assign the threat topic classification includes analyzing each posting using a Natural Language Processing (NLP) algorithm.

13. The apparatus of claim 9, wherein the posting activity score is determined using a weighted average based on a number of postings and a date of postings made by the threat actor on the source forum.

14. The apparatus of claim 9, wherein the threat actor rank is equal to the OFR multiplied by the posting activity score added to the number of times the threat actor is mentioned by other threat actors on the source forum.

15. The apparatus of claim 9, further configured to:
receive a request from a requestor to query the CCC data;
query the CCC data for the request; and
send the query results to the requestor, wherein the query results include a portion of the CCC data and the associated enriched data, wherein the associated enriched data includes one or more of the source forum, the threat topic classification, the threat topic rank, the threat actor, the threat actor rank, and the other threat actors that mentioned the threat actor.

16. A method, comprising:
receiving CCC data of a plurality of source forums, wherein the CCC data of each source forum of the plurality of source forums includes a plurality of postings made on the respective source forum;
storing the CCC data;
extracting artifacts from the CCC data, wherein the extracted artifacts indicate the source forum, a threat topic, or a threat actor of a posting;
storing the extracted artifacts according to a pre-defined taxonomy;
for each posting of the plurality of postings:
identifying the source forum;
assigning a first threat topic classification based on a first analysis; and
assigning a first threat topic rank based on the first threat topic classification;
for each source forum of the plurality of source forums:
determining a source forum rank for the source forum based on the first threat topic rank assigned to each posting of the plurality of postings from the source forum;
identifying the source forum having the greatest source forum rank;
for each posting of the plurality of postings of the source forum having the greatest source forum rank:
assigning a second threat topic classification based on a second analysis; and
assigning a second threat topic rank based on the second threat topic classification;
identifying a first subset of postings from the source forum having the greatest forum rank, wherein the first subset of postings includes postings assigned the second threat topic classification with the greatest second threat topic rank;
for each posting of the first subset of postings:
identifying the threat actor; and
assigning a threat actor rank based at least in part on an official source forum rank (OFR), a posting activity score, or a number of times the threat actor is mentioned by other threat actors on the source forum;
identifying a second subset of postings from the first subset of postings, wherein the second subset of postings includes postings made by the threat actor assigned the greatest threat actor rank; and
sending, to a cybersecurity data exchange module, the CCC data of the second subset of postings and associated enriched data, wherein the associated enriched data includes one or more of the source forum, the threat topic classification, the threat topic rank, the threat actor, the threat actor rank, and the other threat actors that mentioned the threat actor.

17. The method of claim 16, wherein the first analysis includes analyzing each posting using a Natural Language Processing (NLP) algorithm and the second analysis includes analyzing each posting using a keyword topic list.

18. The method of claim 17, further comprising:
calculating a threat topic score based on the keyword topic list analysis; and
assigning the threat topic classification based on the threat topic score.

19. The method of claim 16, wherein the posting activity score is determined using a weighted average based on a number of postings and a date of postings made by the threat actor on the source forum.

20. The method of claim 16, wherein the threat actor rank is equal to the threat actor's OFR multiplied by the threat actor's posting activity score added to the number of times the threat actor is mentioned by other threat actors on the source forum.

* * * * *